United States Patent
Günther et al.

(10) Patent No.: US 11,856,684 B2
(45) Date of Patent: Dec. 26, 2023

(54) NOZZLE FOR A PLASMA ARC TORCH HEAD, LASER CUTTING HEAD AND PLASMA LASER CUTTING HEAD, ASSEMBLIES, PLASMA ARC TORCH HEAD AND PLASMA ARC TORCH COMPRISING SAME, LASER CUTTING HEAD COMPRISING SAME, AND PLASMA LASER CUTTING HEAD COMPRISING SAME

(71) Applicant: Kjellberg-Stiftung, Finsterwalde (DE)

(72) Inventors: Vadim Günther, Finsterwalde (DE);
Volker Krink, Finsterwalde (DE);
Timo Grundke, Finsterwalde (DE);
Frank Laurisch, Finsterwalde (DE)

(73) Assignee: KJELLBERG-STIFTUNG, Finsterwalde (DE)

( * ) Notice: Subject to any disclaimer, the term of this patent is extended or adjusted under 35 U.S.C. 154(b) by 740 days.

(21) Appl. No.: 16/649,927

(22) PCT Filed: Sep. 14, 2018

(86) PCT No.: PCT/DE2018/100789
§ 371 (c)(1),
(2) Date: Mar. 23, 2020

(87) PCT Pub. No.: WO2019/057244
PCT Pub. Date: Mar. 28, 2019

(65) Prior Publication Data
US 2020/0314993 A1 Oct. 1, 2020

(30) Foreign Application Priority Data

Sep. 22, 2017 (DE) .......................... 102017122015.1
Jan. 17, 2018 (DE) .......................... 102018100917.8

(51) Int. Cl.
*H05H 1/34* (2006.01)

(52) U.S. Cl.
CPC ............ *H05H 1/3405* (2013.01); *H05H 1/34* (2013.01); *H05H 1/3421* (2021.05); *H05H 1/3478* (2021.05)

(58) Field of Classification Search
CPC .... B23K 10/00; B23K 10/02; B23K 26/1462; B23K 26/38; H05H 1/34; H05H 1/3405;
(Continued)

(56) References Cited

U.S. PATENT DOCUMENTS 4,300,723 A * 11/1981 Prasthofer ............... B05B 15/65
239/499
4,866,240 A * 9/1989 Webber .................... H05H 1/42
219/121.48
(Continued)

FOREIGN PATENT DOCUMENTS

DE 102007005316 * 6/2008
DE 102011088433 * 12/2012
(Continued)

OTHER PUBLICATIONS

JP2175080 translation (Year: 2022).*
EP0748149 translation (Year: 2022).*
RU218814 translation (Year: 2022).*

*Primary Examiner* — Nathaniel E Wiehe
*Assistant Examiner* — Frederick F Calvetti
(74) *Attorney, Agent, or Firm* — Jonathan M. D'Silva; MMI Intellectual Property

(57) ABSTRACT

Nozzle for a plasma torch head, laser cutting head or plasma laser cutting head, arrangement composed of such a nozzle and of a nozzle protection cap, arrangement composed of such a nozzle and of an electrode, plasma torch head, laser cutting head or plasma laser cutting head having such a nozzle and/or having such an arrangement, plasma torch comprising such a plasma torch head, laser cutting head comprising such a nozzle and/or such an arrangement, (Continued)

plasma laser cutting head comprising such a nozzle and/or such an arrangement, method for plasma cutting, method for laser cutting and method for plasma laser cutting using the same.

27 Claims, 32 Drawing Sheets

(58) Field of Classification Search
CPC ... H05H 1/3478; H05H 1/3484; H05H 1/3421
USPC .................................................... 219/121.5
See application file for complete search history.

(56) References Cited

U.S. PATENT DOCUMENTS

| | | | | |
|---|---|---|---|---|
| 5,573,682 | A * | 11/1996 | Beason, Jr. ............. | H05H 1/34 427/446 |
| 5,695,662 | A | 12/1997 | Couch, Jr. et al. | |
| 5,736,708 | A * | 4/1998 | Delzenne ................ | H05H 1/34 219/121.52 |
| 7,605,340 | B2 * | 10/2009 | Duan ...................... | H05H 1/34 219/121.49 |
| 8,853,589 | B2 * | 10/2014 | Krink ...................... | H05H 1/28 219/121.49 |
| 10,129,970 | B2 * | 11/2018 | Merrill .................... | H05H 1/34 |
| 2015/0245459 | A1 * | 8/2015 | Namburu ................ | H05H 1/34 219/121.5 |
| 2016/0037618 | A1 * | 2/2016 | Merrill .................... | H05H 1/34 219/121.5 |
| 2018/0332698 | A1 * | 11/2018 | Merrill .................... | H05H 1/34 |

FOREIGN PATENT DOCUMENTS

| | | | |
|---|---|---|---|
| EP | 0748149 | * | 11/1996 |
| JP | 2175080 | * | 2/1990 |
| SU | 218814 | * | 6/1985 |
| WO | WO 2016/138524 | * | 1/2016 |
| WO | 2016138524 A1 | | 9/2016 |

* cited by examiner

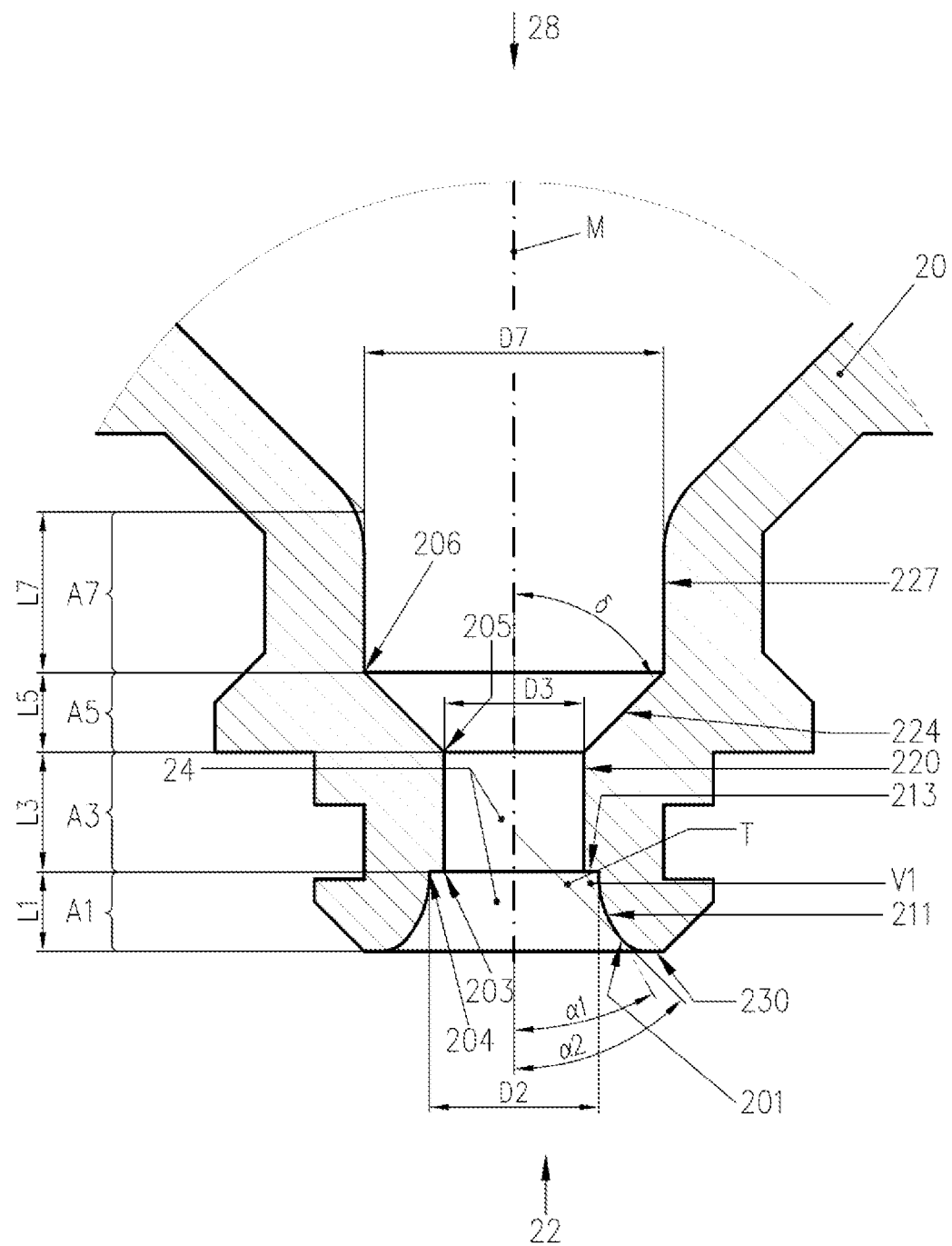
Figure 5.1

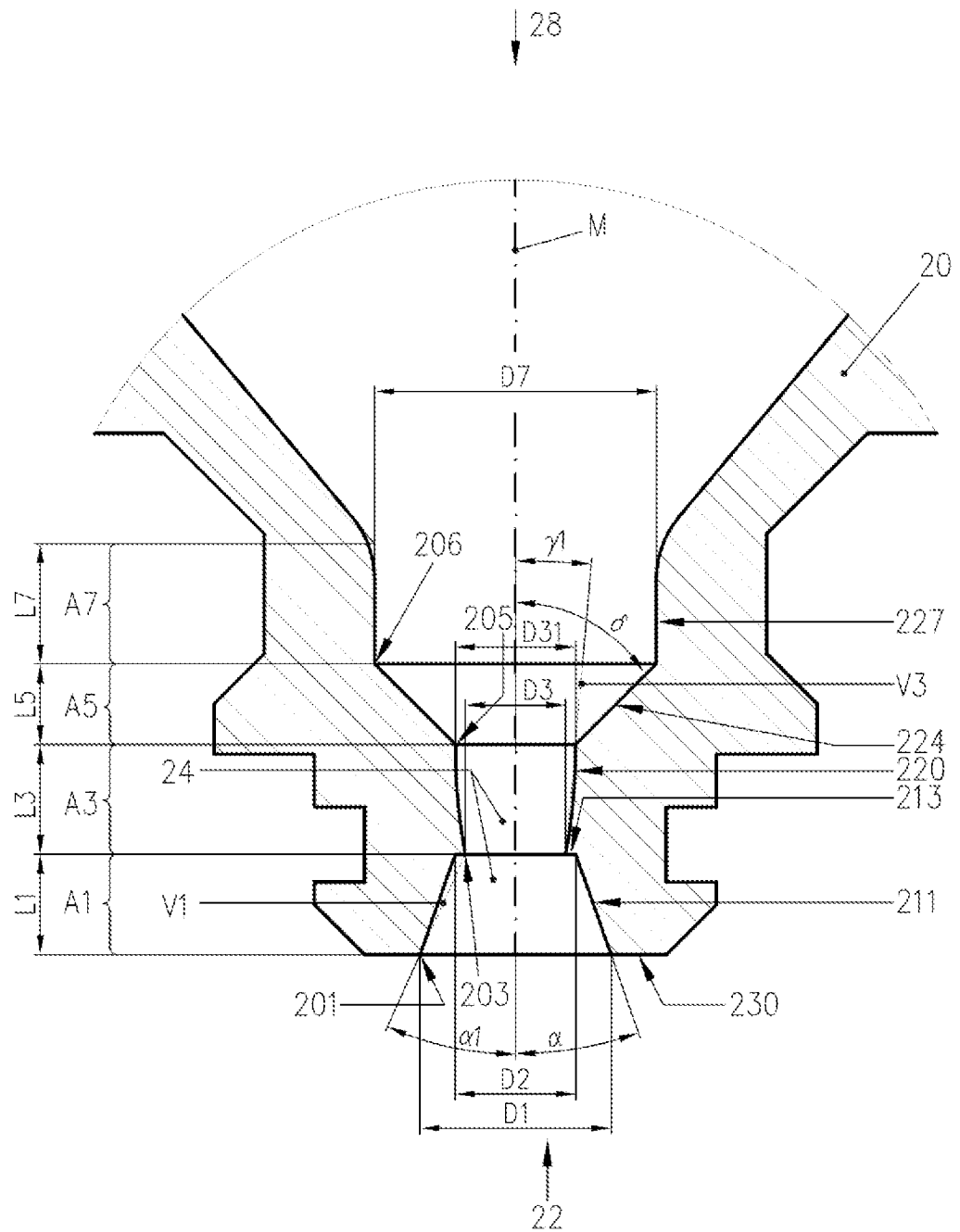
Figure 7.1

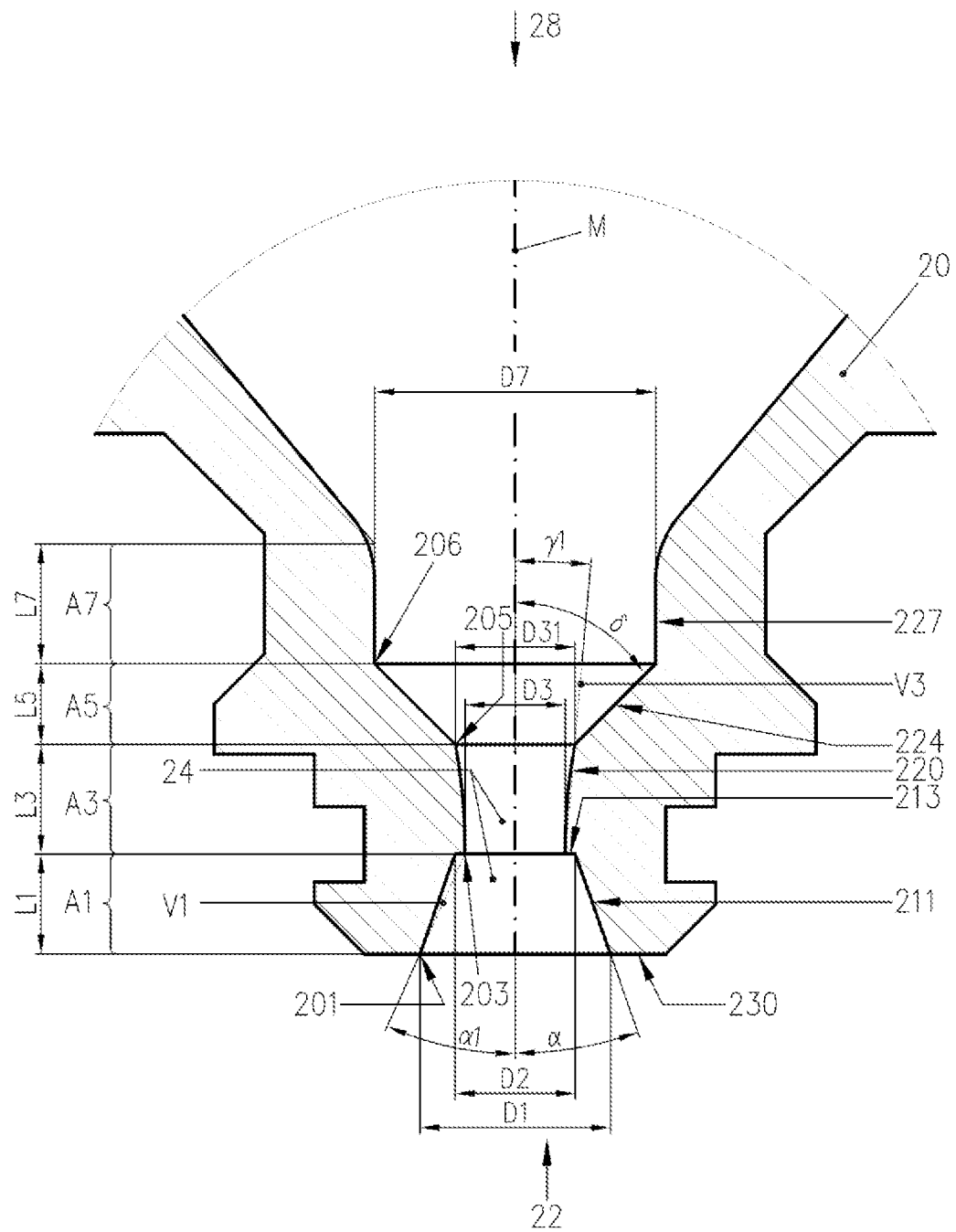
Figure 7.2

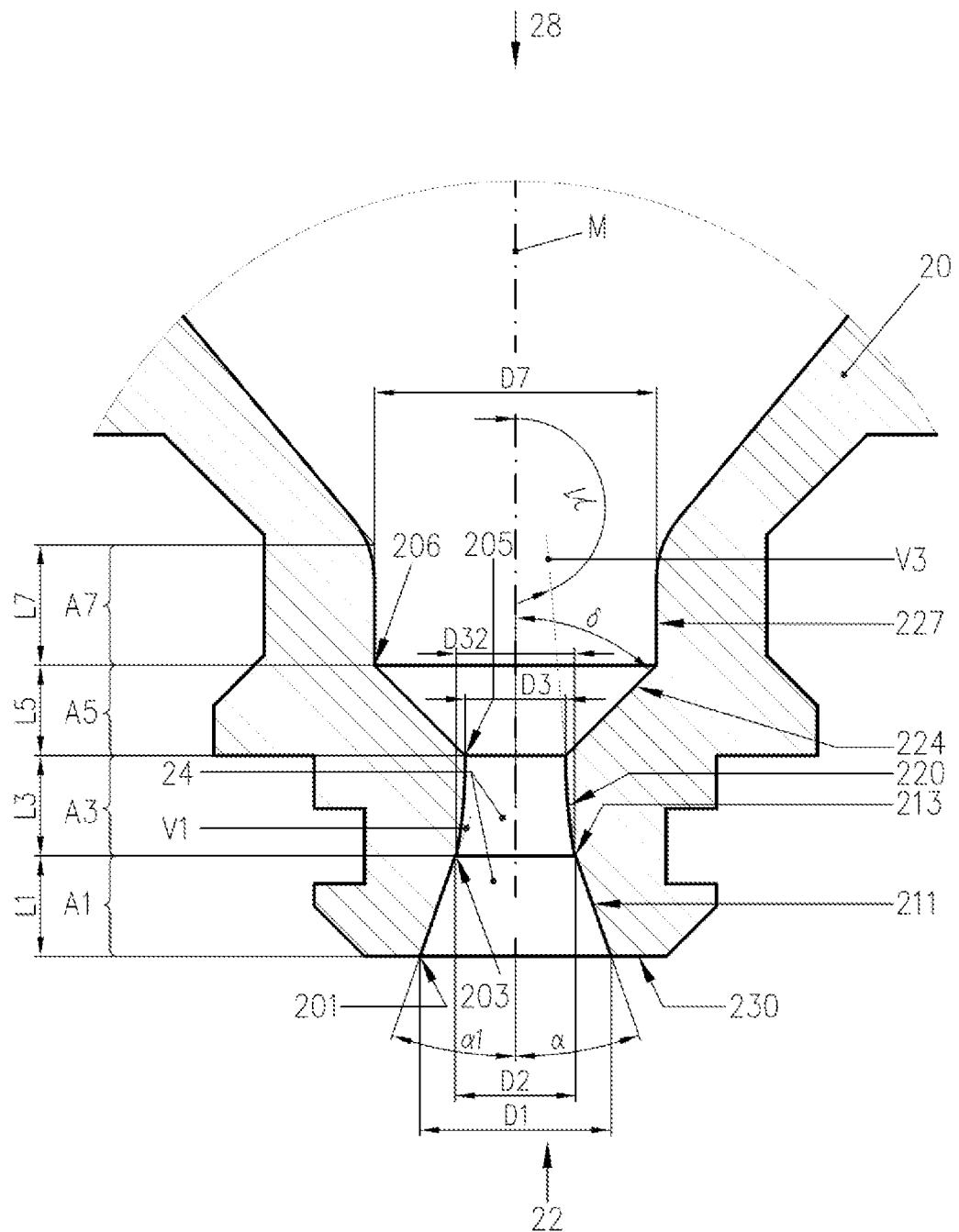
Figure 8.1

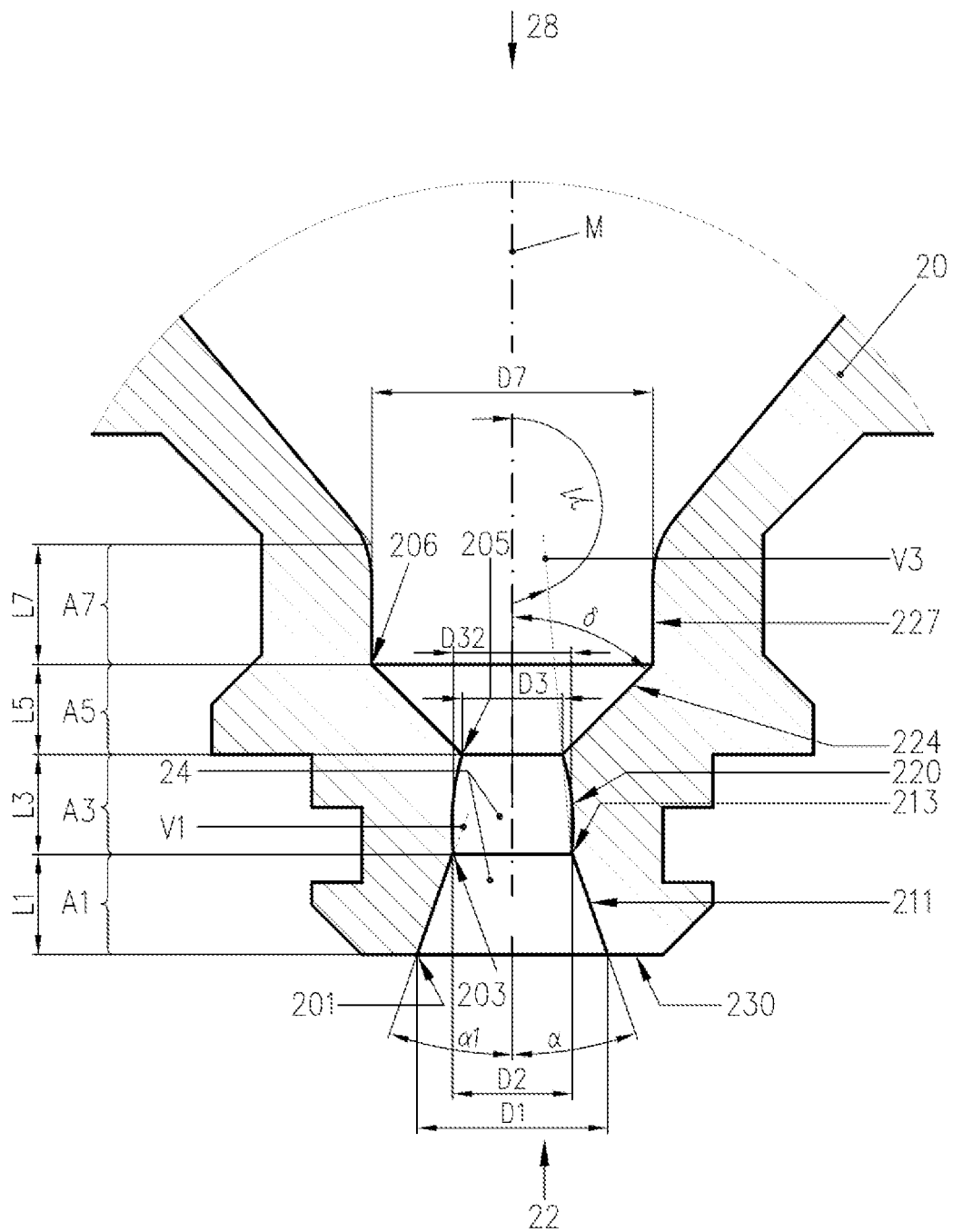
Figure 8.2

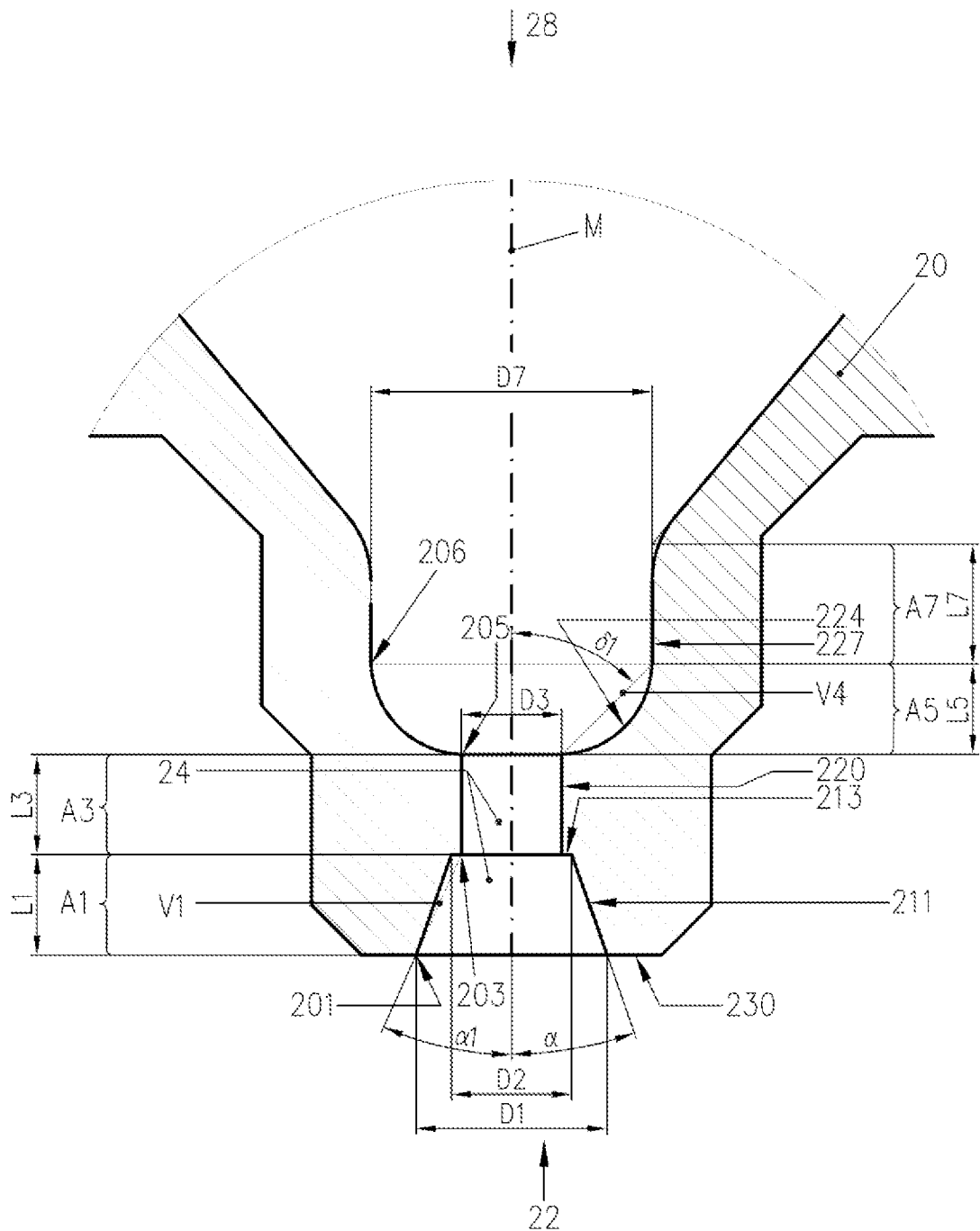
Figure 9.1

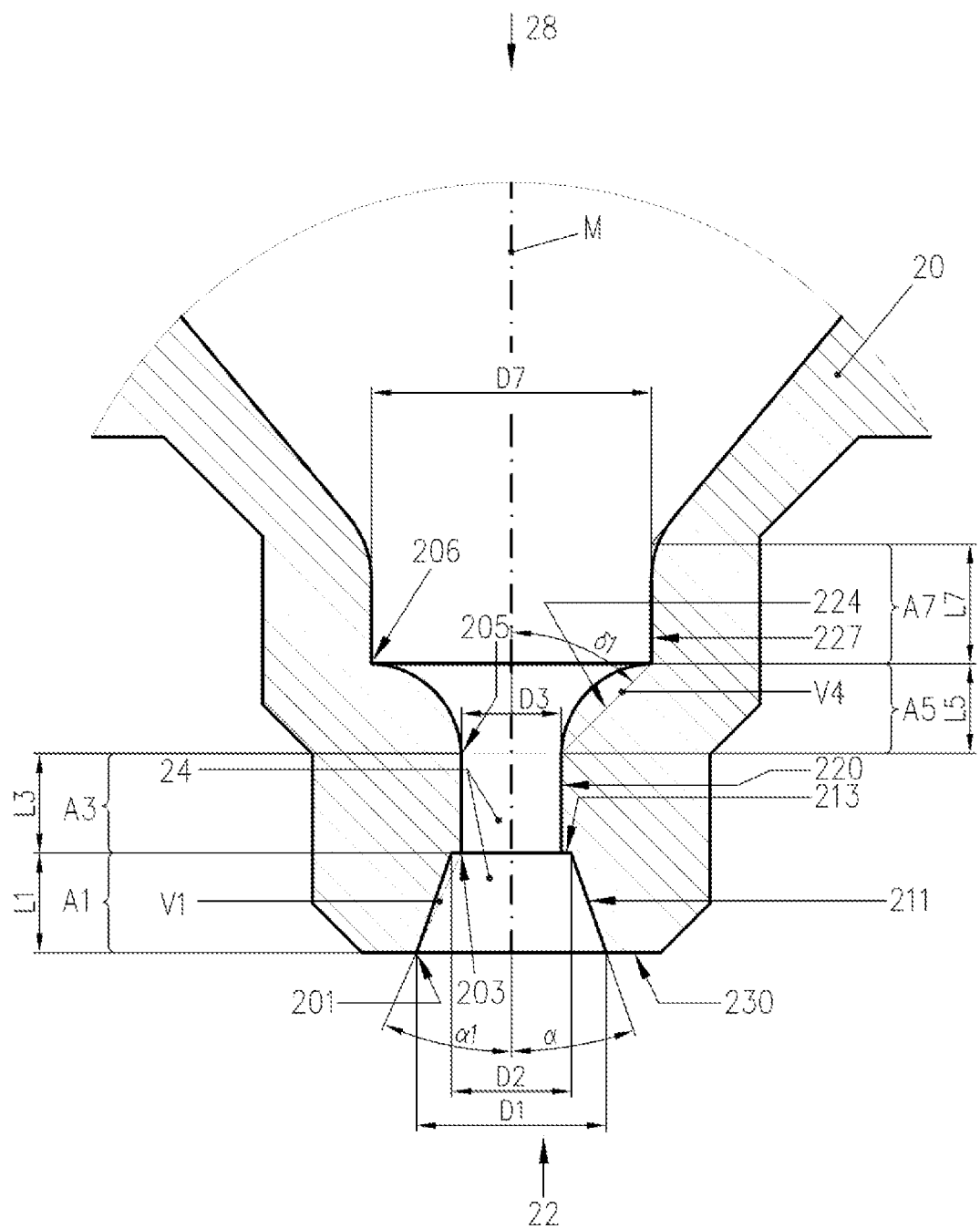
Figure 9.2

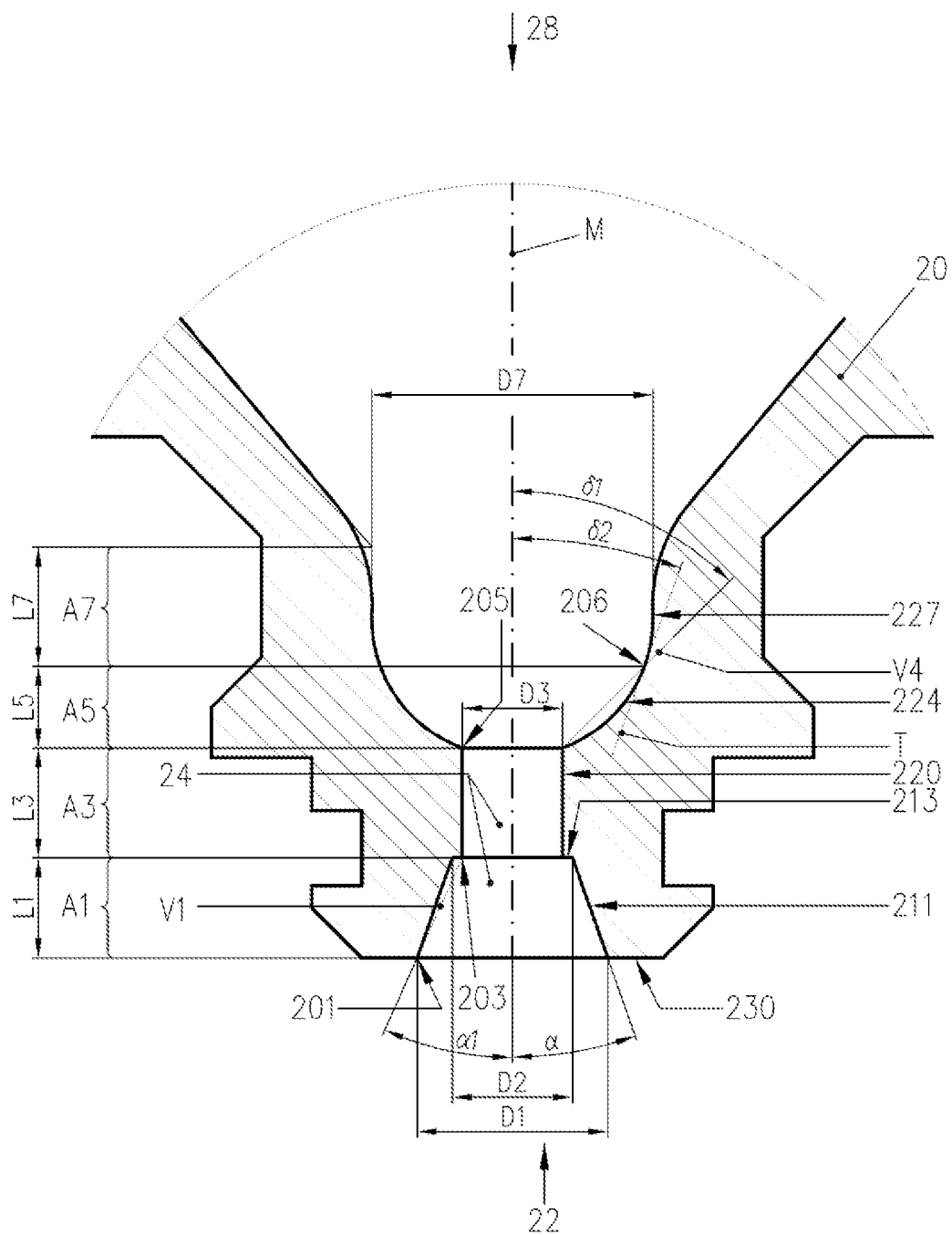
Figure 9.3

NOZZLE FOR A PLASMA ARC TORCH HEAD, LASER CUTTING HEAD AND PLASMA LASER CUTTING HEAD, ASSEMBLIES, PLASMA ARC TORCH HEAD AND PLASMA ARC TORCH COMPRISING SAME, LASER CUTTING HEAD COMPRISING SAME, AND PLASMA LASER CUTTING HEAD COMPRISING SAME

Plasma torches, laser cutting heads and plasma laser cutting heads are used very generally for the thermal processing of electrically conductive materials such as steel and nonferrous metals.

Plasma torches are commonly composed of a torch body, of an electrode, of a nozzle and of a bracket for the same. Modern plasma torches additionally have a nozzle protection cap which is fitted over the nozzle. A nozzle is often fixed by means of a nozzle cap.

Depending on the type of plasma torch, the components which wear out as a result of the operation of the plasma torch owing to the high thermal loading caused by the arc are in particular the electrode, the nozzle, the nozzle cap, the nozzle protection cap, the nozzle protection cap bracket and the plasma-gas-conducting unit and secondary-gas-conducting unit parts. These components can easily be changed by an operator and are therefore referred to as wearing parts.

Plasma torches are connected via lines to an electrical power source and to a gas supply, which provide a supply to the plasma torch. Furthermore, the plasma torch may be connected to a cooling device for a cooling medium, such as for example a cooling liquid.

High thermal loading is encountered in plasma cutting torches. This is caused by the intense constriction of the plasma jet through the nozzle bore. Here, small bores are used in order that high current densities of 50 to 150 A/mm$^2$ in the nozzle bore, high energy densities of approximately $2 \times 10^6$ W/cm$^2$ and high temperatures of up to 30 000 K are generated. Furthermore, relatively high gas pressures, generally up to 12 bar, are used in the plasma cutting torch. The combination of high temperature and high kinetic energy of the plasma gas flowing through the nozzle bore lead to the melting of the workpiece and to the expulsion of the melt. A kerf is formed, and the workpiece is cut. Depending on the cutting current and current density in the nozzle and the gases used, a high level of noise pollution arises as the plasma jet emerges from the nozzle and/or from the nozzle protection cap. This may amount to over 100 dB(A). The sound frequencies perceptible to humans lie in the range from approximately 20 Hertz to approximately 20 000 Hertz. High frequencies (>1000 Hertz) with large amplitudes are not only perceived as unpleasant but can also have adverse effects on health if suitable protective means are not used. If one records the frequencies of the sound during plasma cutting, one observes considerable amplitudes between 1000 Hertz and 15 000 Hertz.

In plasma cutting, use is often made of oxidizing gases to cut unalloyed or low-alloy steels and of non-oxidizing gases to cut high-alloy steels or nonferrous metals.

A plasma gas flows between the electrode and the nozzle. The plasma gas is conducted by means of a gas-conducting part. This allows the plasma gas to be directed in targeted fashion. It is often caused to rotate about the electrode by means of a radial and/or axial offset of the openings in the plasma-gas-conducting part. The plasma-gas-conducting part is composed of electrically isolating material, because the electrode and the nozzle must be electrically isolated from one another. This is necessary because the electrode and the nozzle have different electrical potentials during the operation of the plasma cutting torch. For the operation of the plasma cutting torch, an arc is generated between the electrode and the nozzle and/or the workpiece, which arc ionizes the plasma gas. To ignite the arc, a high voltage can be applied between the electrode and the nozzle, which high voltage serves for pre-ionizing the distance between the electrode and the nozzle and thus for forming an arc. The arc burning between electrode and nozzle is also referred to as pilot arc.

The pilot arc emerges through the nozzle bore and strikes the workpiece and ionizes the distance to the workpiece. This allows the arc to form between electrode and workpiece. This arc is also referred to as main arc. While the main arc is burning, the pilot arc can be deactivated. It may however continue to be operated. In the case of plasma cutting, said pilot art is often deactivated so as not to place an additional load on the nozzle.

The electrode and the nozzle in particular are thermally highly loaded and must be cooled. At the same time, they must also conduct the electrical current required to form the arc. Therefore, for this, use is made of materials which exhibit good heat conductivity and good electrical conductivity, generally metals, for example copper, silver, aluminum, tin, zinc, iron or alloys in which at least one of these metals is contained.

The electrode is often composed of an electrode holder and an emission insert, which is produced from a material that has a high melting temperature (<2000° C.) and a lower electron work function than the electrode holder. As materials for the emission insert, tungsten is used in the case of use of non-oxidizing plasma gases, such as argon, hydrogen, nitrogen, helium and mixtures thereof, and hafnium or zirconium is used in the case of use of oxidizing gases, such as oxygen, air and mixtures thereof, nitrogen-oxygen mixture and mixtures with other gases. The high-temperature material may be fitted, for example pressed with positively locking and/or non-positively locking action, into an electrode holder which is composed of material which exhibits good heat conductivity and good electrical conductivity.

The cooling of the electrode and nozzle may be performed by means of gas, for example the plasma gas or a secondary gas which flows along the outer side of the nozzle. Cooling by means of a liquid, for example water, is however more effective. Here, the electrode and/or the nozzle are often cooled directly with the liquid, that is to say the liquid is in direct contact with the electrode and/or the nozzle. In order to conduct the cooling liquid around the nozzle, a nozzle cap is situated around the nozzle, the inner surface of which nozzle cap forms, together with the outer surface of the nozzle, a coolant space in which the coolant flows.

In the case of modern plasma cutting torches, a nozzle protection cap is additionally situated outside the nozzle and/or the nozzle cap. The inner surface of the nozzle protection cap and the outer surface of the nozzle or of the nozzle cap form a space through which a secondary or shielding gas flows. The secondary or shielding gas emerges from the bore of the nozzle protection cap and envelops the plasma jet and serves to realize a defined atmosphere around the latter. The secondary gas additionally protects the nozzle and the nozzle protection cap from arcs that may form between these and the workpiece. These are referred to as double arcs and can lead to damage to the nozzle. In particular upon the plunge cutting into the workpiece, the nozzle and the nozzle protection cap are subjected to high loading owing to hot spraying of material. The secondary gas, the volume flow of which may be increased during the plunge cutting in relation to the value during the cutting process, keeps the spraying material away from the nozzle and the nozzle protection cap and thus protects these from damage.

The nozzle protection cap is likewise thermally highly loaded and must be cooled. Therefore, for this, use is made of materials which exhibit good heat conductivity and good electrical conductivity, generally metals, for example copper, silver, aluminum, tin, zinc, iron or alloys in which at least one of these metals is contained.

The electrode and the nozzle may also be cooled indirectly. Here, they are in physical contact with a component which is composed of a material which exhibits good heat conductivity and good electrical conductivity, generally a metal, for example copper, silver, aluminum, tin, zinc, iron or alloys in which at least one of these metals is contained. Said component is in turn cooled directly, that is to say it is in direct contact with the normally flowing coolant. These components may simultaneously serve as a bracket or receptacle for the electrode, the nozzle, the nozzle cap or the nozzle protection cap and dissipate the heat and supply the current.

It is also possible for only the electrode or only the nozzle to be cooled with liquid.

The nozzle protection cap is normally cooled only by means of the secondary gas. Arrangements are also known in which the secondary gas cap is cooled directly or indirectly by means of a cooling liquid.

As described further above, in the case of plasma cutting, high levels of noise pollution with sound pressure levels of in some cases over 100 dB(A) arise owing to the high energy density and the high flow speed of the plasma or of the plasma gas. The magnitude of the sound pressure level is dependent inter alia on the electrical power with which the plasma is operated and/or on the cutting current, on the cutting current density in the nozzle opening, on the workpiece thickness and thus the arc length, on the cutting speed and on the plasma or secondary gases that are used. With higher power, higher cutting current, higher current density, greater workpiece thickness and longer arc length, the noise pollution increases. In the case of some plasma cutting technologies, this is additionally supplemented by a so-called whistling sound, which is particularly unpleasant and loud to the human ear. This arises in particular if the plasma gas is set in high-speed rotation for example by a corresponding plasma-gas-conducting unit.

Laser cutting heads are composed substantially of a body, of an optical system in the body for focusing the laser beam, of connectors for the laser light supply or the optical waveguide, gas (cutting gas and secondary gas) and cooling medium, and of a nozzle with an opening which shapes the gas jet of the cutting gas and through which the laser beam also emerges from the laser cutting head. The laser beam strikes a workpiece and is absorbed. In combination with the cutting gas, the heated workpiece is melted and expelled (laser fusion cutting) or oxidized (laser oxygen cutting).

In the case of the laser cutting head, it is possible for a nozzle protection cap to additionally be situated outside the nozzle. The inner surface of the nozzle protection cap and the outer surface of the nozzle or of the nozzle cap form a space through which a secondary or shielding gas flows. The secondary or shielding gas emerges from the bore of the nozzle protection cap and envelops the laser beam and serves to realize a defined atmosphere around the latter. The secondary gas additionally protects the nozzle. In particular upon the plunge cutting into the workpiece, the nozzle is subjected to high loading owing to hot spraying of material. The secondary gas, the volume flow of which may be increased during the plunge cutting in relation to the value during the cutting process, keeps the spraying material away from the nozzle and thus protects this from damage.

High levels of noise pollution likewise arise as the gas jet emerges from the nozzle opening, in particular in the case of large volume flows of the cutting gas. Large volume flows are required in particular in the case of laser fusion cutting, for example of high-alloy steels and aluminum.

Machining heads in which both plasma jet cutting and laser beam cutting are used simultaneously, so-called plasma laser cutting heads, have features of the plasma torch head and of the laser cutting head. Here, the features and thus also the advantages of both cutting methods are combined with one another.

Noise can be detrimental to health. It is the aim of the invention to reduce the noise pollution during plasma cutting, during laser cutting (laser beam cutting) (with process gas) and during plasma laser cutting, as far as possible without impairing the cutting speed and cut quality.

According to the invention, said object is achieved by means of a nozzle for a plasma torch head, laser cutting head or plasma laser cutting head, comprising a body with a longitudinal axis M, a front end, a rear end and a nozzle opening at the front end, wherein the nozzle opening at the front end, as viewed from the front end, comprises at least the following portions in a longitudinal sectional view: a first portion A1 which extends along the longitudinal axis M and which narrows in the direction of the rear end and which has an inner surface and a body edge at the front end, and a second portion A3 which extends along the longitudinal axis M and which has an inner surface and a body edge at the transition from the first portion A1 to the second portion A3, wherein either the first portion A1 does not narrow linearly over its entire length and a virtual connecting line V1 between the body edge of the nozzle opening at the front end and the body edge at the transition from the first portion A1 to the second portion A3 and the longitudinal axis M enclose an angle $\alpha 1$ in a range from 15° to 40°, more preferably in a range from 20° to 38°, even more preferably in a range from 20° to 35° and most preferably in a range from 25° to 35°, and/or the inner surface (211) of the first portion A1 and the longitudinal axis M enclose an angle $\alpha$ in a range from 10° to 30°, more preferably in a range from 12° to 30°, even more preferably in a range from 14° to 25°, even more preferably in a range from 15° to 20° and most preferably in the range from 17° to 20°, and either a virtual connecting line V3 between the body edge (203) at the transition from the first portion A1 to the second portion A3 and the body edge (205) at the transition from the second portion A3 to the third portion A5 and the longitudinal axis M enclose an angle $\gamma 1$ in a range from 0° to 8°, preferably of 5°, and widens in the direction of the rear end (28), or in a range from 172° to 180°, preferably of 175°, and narrows in the direction of the rear end (28), or runs parallel to the longitudinal axis M, or the inner surface (220) of the second portion A3 widens at an angle $\gamma$ in a range from 0° to 8°, preferably of 5°, in the direction of the rear end (28) or narrows at an angle in a range from 172° to 180°, preferably of 175°, in the direction of the rear end (28), or runs parallel to the longitudinal axis M.

Furthermore, said object is achieved by means of an arrangement composed of a nozzle as claimed and a nozzle protection cap, wherein the nozzle and the nozzle protection cap are arranged spaced apart from one another at least in the region of the front end and of the nozzle opening, and the nozzle protection cap has an opening which is in alignment with the nozzle opening on the longitudinal axis M.

Said object is furthermore achieved by means of an arrangement composed of a nozzle as claimed and an electrode, which are arranged spaced apart from one another along the longitudinal axis M.

Furthermore, said object is achieved by means of a plasma torch head comprising a nozzle as claimed and/or an arrangement as claimed.

Furthermore, said object is achieved by means of a plasma torch comprising a plasma torch head as claimed.

Furthermore, said object is achieved by means of a laser cutting head comprising a nozzle as claimed and/or an arrangement as claimed.

Furthermore, said object is achieved by means of a plasma laser cutting head comprising a nozzle as claimed and/or an arrangement as claimed.

Said object is also achieved by means of a method for plasma cutting, wherein a plasma torch as claimed is used.

Furthermore, said object is also achieved by means of a method for laser cutting, wherein a laser cutting head as claimed is used.

Finally, said object is also achieved by means of a method for plasma laser cutting, wherein a plasma laser cutting head as claimed is used.

In the case of the nozzle, provision may be made whereby, at the transition or before or immediately before the transition from the first portion A1 to the second portion A3, there is situated at least one further inner surface 213 which extends at an angle β with respect to the longitudinal axis M in a range from 45° to 120°, more preferably in a range from 60° to 110°, even more preferably in a range from 80° to 100° and even more preferably in a range from 85° to 95°, most preferably perpendicular. The inner surface 213 is situated between the body edge 203 and the inner surface 211, wherein a transition may be of stepped or continuous form.

It is advantageous if, as viewed from the front end, after the second portion A3, there is provided a third portion A5 which extends along the longitudinal axis M, which widens in the direction of the rear end and which has an inner surface.

In particular, provision may be made here whereby the inner surface of the third portion A5 has at least one region which widens along the longitudinal axis M in the direction of the rear end and whose inner surface and the longitudinal axis M enclose an angle δ in a range from 30° to 90°, more preferably in a range from 40° to 75°.

Alternatively, provision may be made here whereby, as viewed from the front end, a fourth portion A7 with an inner surface is provided after the third portion A5, and a virtual connecting line V4 between the body edge at the transition from the second portion A3 to the third portion A5 and the body inner edge at the transition from the third portion A5 to the fourth portion A7 and the longitudinal axis M enclose an angle δ1 in a range from 30° to 90°, more preferably in a range from 40° to 75°, and/or the inner surface (224) of the third portion A5 and the longitudinal axis M enclose an angle δ in a range from 30° to 90°, more preferably in a range from 40° to 75°.

In turn, provision may alternatively be made whereby, as viewed from the front end 22, a fourth portion A7 with an inner surface is provided after the third portion A5, wherein the inner surface 227 of the fourth portion A7 has at least one region which widens at an angle ε with respect to the longitudinal axis M in a range from 0° to 10°, preferably of 5°, in the direction of the rear end 28 or narrows at an angle in a range from 170° to 180°, preferably of 175°, in the direction of the rear end 28, or runs parallel to the longitudinal axis M, or wherein the inner surface 227 of the fourth portion A7 widens at an angle ε with respect to the longitudinal axis M in a range from 0° to 10°, preferably of 5°, in the direction of the rear end 28 or narrows at an angle in a range from 170° to 180°, preferably of 175°, in the direction of the rear end 28, or runs parallel to the longitudinal axis M.

In particular, provision may be made here whereby, as viewed from the front end, a fourth portion A7 with an inner surface is provided after the third portion A5, wherein the inner surface of the fourth portion A7 widens at an angle ε with respect to the longitudinal axis M in a range from 0° to 10°, preferably of 5°, in the direction of the rear end or narrows at an angle in a range from 170° to 180°, preferably of 175°, in the direction of the rear end, or runs parallel to the longitudinal axis M.

In a further particular embodiment, the first portion A1, as viewed from the front end, narrows in conical, convex or concave fashion
and/or
the second portion A3 narrows or widens in conical, convex or concave fashion
and/or
the third portion A5 widens in conical, convex or concave fashion
and/or
the fourth portion A7 narrows or widens in conical, convex or concave fashion.

In a particular embodiment, the first portion A1, as viewed from the front end, narrows in continuous or discontinuous fashion and/or
the second portion A3 narrows or widens in continuous or discontinuous fashion, and/or
the third portion A5 widens in continuous or discontinuous fashion, and/or
the fourth portion A7 narrows or widens in continuous or discontinuous fashion.

In a further particular embodiment, the first portion A1, as viewed from the front end, narrows in stepped fashion, and/or
the second portion A3 narrows or widens in stepped fashion and/or perpendicularly with respect to the longitudinal axis M, and/or
the third portion A5 widens in stepped fashion and/or perpendicularly with respect to the longitudinal axis M, and/or
the fourth portion A7 narrows or widens in stepped fashion and/or perpendicularly with respect to the longitudinal axis M.

Expediently,
the first A1 and the second portion A3 or
the second portion A3 and the third portion A5 or
the third portion A5 and the fourth portion A7 or
the first portion A1, the second portion A3 and the third portion A5 or
the second portion A3, the third portion A5 and the fourth portion A7 or
the first portion A1, the second portion A3, the third portion A5 and the fourth portion A7
directly follow one another.

It is advantageously the case that a largest cross-sectional area A10 of the first portion A1, and/or a largest cross-sectional area of the nozzle opening situated directly at the front end of the nozzle opening, are/is at least 1.7, preferably 2.1, times larger, and/or at most 4.0, preferably 3.7, times larger, than a smallest cross-sectional area A30, A31 of the second portion A3 and/or a smallest cross-sectional area A30, A31 of the nozzle opening.

It is expediently the case that a largest diameter D1 of the first portion A1, and/or a largest diameter D1 of the nozzle opening situated directly at the front end of the nozzle opening, are/is at least 1.3, preferably 1.45, times larger, and/or at most 2.1, preferably 1.9, times larger, than a smallest diameter D3 of the second portion A3 and/or a smallest diameter D3 of the nozzle opening.

It is preferably the case that a largest diameter D1 of the first portion A1, and/or a largest diameter D1 of the nozzle opening situated directly at the front end of the nozzle opening, are/is at least 0.5 mm, preferably 0.6 mm, larger, and/or at most 1.2 mm, preferably 1.0 mm, larger, than a smallest diameter D3 of the second portion A3 and/or a smallest diameter D3 of the nozzle opening.

It is advantageously the case that the quotient L1/L3 of the length L1, extending along the longitudinal axis M, of the first portion A1 and of the length L3, extending along the longitudinal axis M, of the second portion A3 amounts to between 0.5 to 1.2, preferably between 0.65 and 1.

It is preferably the case that the quotient L5/L1 of the length L5, extending along the longitudinal axis M, of the third portion A3 and of the length L1, extending along the longitudinal axis M, of the first portion A1 is less than or equal to 1.5, preferably less than or equal to 1.25.

It is preferably the case that the quotient L5/L3 of the length L5, extending along the longitudinal axis M, of the third portion A3 and of the length L3, extending along the longitudinal axis, of the second portion A3 is less than or equal to 1.25, preferably less than or equal to 1.

In a particular embodiment, for the lengths of the first, second, third and fourth portions, the following applies:
L1<=2 mm, L3<=3 mm, L5<=2 mm and L7<=3 mm, preferably
L1<=1 mm, L3<=1.5 mm, L5<=1.5 mm and L7<=2.5 mm.

It is advantageously the case that the quotient L3/D3 of the length L3, extending along the longitudinal axis M, of the second portion A3 and of the diameter D3 of the second portion A3 amounts to between 0.6 and 1.7, preferably between 0.65 and 1.55.

It is expediently the case that a largest diameter D7 of the fourth portion A5 is at least equal to, and at most twice as large as, a or the largest diameter D1 of the first portion A1 and/or a or the largest diameter D1 of the nozzle opening situated directly at the front end of the nozzle opening 24.

It is advantageously the case that a volume V10 formed by the inner surface(s) of the first portion A1 is larger, preferably at least 1.3 times larger and/or at most 2.5 times larger, even more preferably at most 2.2 times larger, than a volume V30 formed by the inner surface of the second portion A3.

It is expediently the case that, at the transition from the first portion A1 to the second portion A3, the diameter D3 of the second portion A3 is at least 0.2 mm and/or at most 0.6 mm smaller than the diameter D2 and/or the smallest diameter D2 of the first portion A1.

In the case of the arrangement as claimed, it is expediently the case that a nozzle cap 5 is arranged between the outer surface 23 of the nozzle and the inner surface 62 of the nozzle protection cap 6.

It is advantageously the case that the opening 64 of the nozzle protection cap 6 has a larger cross-sectional area A60 than the cross-sectional area A10 of the nozzle 2, preferably a cross-sectional area A60 which is equal to or larger than a virtual area A70 of the nozzle 2 projected by the elongated virtual connecting line V1 onto the nozzle protection cap 6, or has a larger diameter D6 than the diameter D1 of the nozzle 2, preferably a diameter D6 which is equal to or larger than the diameter D70 of a virtual area A70 of the nozzle 2 projected by the elongated virtual connecting line V1 onto the nozzle protection cap 6, and/or the opening 64 of the nozzle protection cap 6 has a larger cross-sectional area A60 than the cross-sectional area A10 of the nozzle (2), preferably a cross-sectional area A60 which is equal to or larger than a virtual area A80 of the nozzle 2 projected by the elongated virtual connecting line V2 onto the nozzle protection cap 6, or has a larger diameter D6 than the diameter D1 of the nozzle 2, preferably a diameter D6 which is equal to or larger than the diameter D80 of a virtual area A80 of the nozzle 2 projected by the elongated virtual connecting line V2 onto the nozzle protection cap 6.

It is expediently the case that the length L1 and/or the length L3 and/or the sum of the lengths L1 and L3 of the first and second portions A1 and A3 of the nozzle is larger than the length of the shortest spacing L61 between the outer surface 23 of the front end of the nozzle and the inner surface 62 of the nozzle protection cap.

It is expediently the case that the nozzle or the nozzle cap is arranged so as to be electrically isolated from the nozzle protection cap by means of a gas-conducting unit which comprises openings.

It is advantageously the case that the openings of the gas-conducting unit are arranged so as to be radially offset with respect to the longitudinal axis M with respect to the longitudinal axis M or with respect to the radial to the longitudinal axis M or so as to be inclined or parallel with respect to the longitudinal axis M or so as to be inclined with respect to the longitudinal axis M.

In a particular embodiment of the arrangement as claimed, said arrangement comprises an electrode, wherein the electrode comprises an electrode holder and an emission insert at the front end of the electrode, the emission insert extends along the longitudinal axis M so as to be aligned with the nozzle opening, the front end of the electrode is arranged in the interior space of the nozzle, wherein the spacing L13 between the outer surface of the front end of the electrode and the portion A3 of the nozzle opening is at least 1.5 times larger than the length L1 of the first portion A1 and/or than the length L3 of the second portion A3 and/or the sum of the lengths L1 and L3 of the first and second portions A1 and A3 of the nozzle.

It is advantageously the case that the nozzle and the electrode are arranged so as to be spaced apart from one another in electrically isolating fashion by means of a gas-conducting unit which comprises openings.

In particular, the gas-conducting unit may comprise openings.

In particular, provision may be made whereby the openings are arranged so as to be radially offset with respect to the longitudinal axis M with respect to the longitudinal axis M or with respect to the radial to the longitudinal axis M or so as to be inclined or parallel with respect to the longitudinal axis M or so as to be inclined with respect to the longitudinal axis M.

The electrode advantageously comprises an electrode holder and an emission insert, wherein the emission insert does not project out of the electrode holder at the front end of the electrode.

In the method, provision may be made whereby an oxidizing, a non-oxidizing and/or a reducing gas or gas mixture are/is used as plasma gas and/or as secondary gas.

The invention is based on the surprising knowledge that the new geometry of the nozzle yields the best reduction of the sound pressure (specifically of the order of magnitude of up to 15 dB(A), that is to say for example from 105-110 dB(A) to down to 90-95 dB(A)) in the relevant frequency range. A cause for this appears to be, according to current knowledge, the relocation of the noise-generating geometry of the nozzle (flow separation edge at the nozzle channel outlet). The noise is generated presumably by the continuous expansion of the arc and/or of the gas as it emerges from the nozzle, and the frequencies generated here are heavily dependent on the exit speed at the body edge (203) of the nozzle, which acts as a separation edge for the plasma arc. Since the body edge is now arranged within the nozzle, the sound waves generated as a result of the expansion of the plasma arc and/or of the gas jet are firstly broken up and are also dampened by the plasma which is still present. The exit speed of the plasma jet may also have been changed by the claimed geometry, such as for example a special countersink, at the front end of the nozzle such that considerably less noise is generated, this being realized with virtually unchanged cut quality. At the same time, a lengthening of the service life of the nozzle is surprisingly achieved. It is presumed that this is achieved as a result of the relocation of the separation edge from the nozzle channel outlet into the nozzle opening and the associated shortening of the section with the smallest nozzle channel diameter or nozzle opening diameter. Thus, the hot plasma jet is in contact with the inner surface of the nozzle opening only over a relatively short section. Furthermore, the so-called separation edge is better protected against damage by external influences, for example against spraying metal upon the plunge cutting into the material for cutting.

Further features and advantages of the invention will emerge from the appended claims and from the following description of exemplary embodiments on the basis of the schematic drawings. In the figures:

Figure 5:
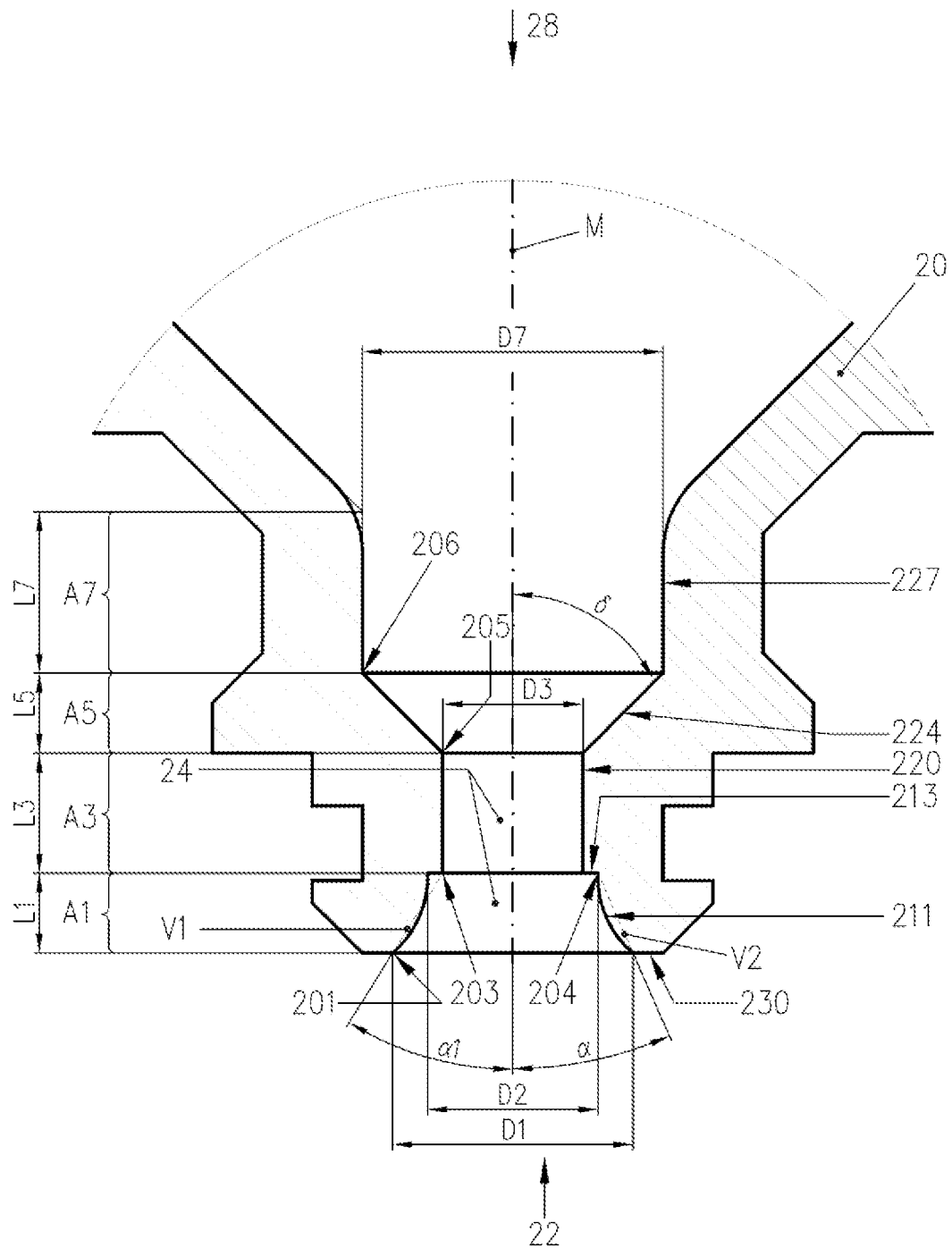
FIG. 5 shows a sectional detail view of the front end of a nozzle according to a particular embodiment of the invention (portion A1 narrowing in convex fashion, $\alpha 1=32°$)
Figure 6:
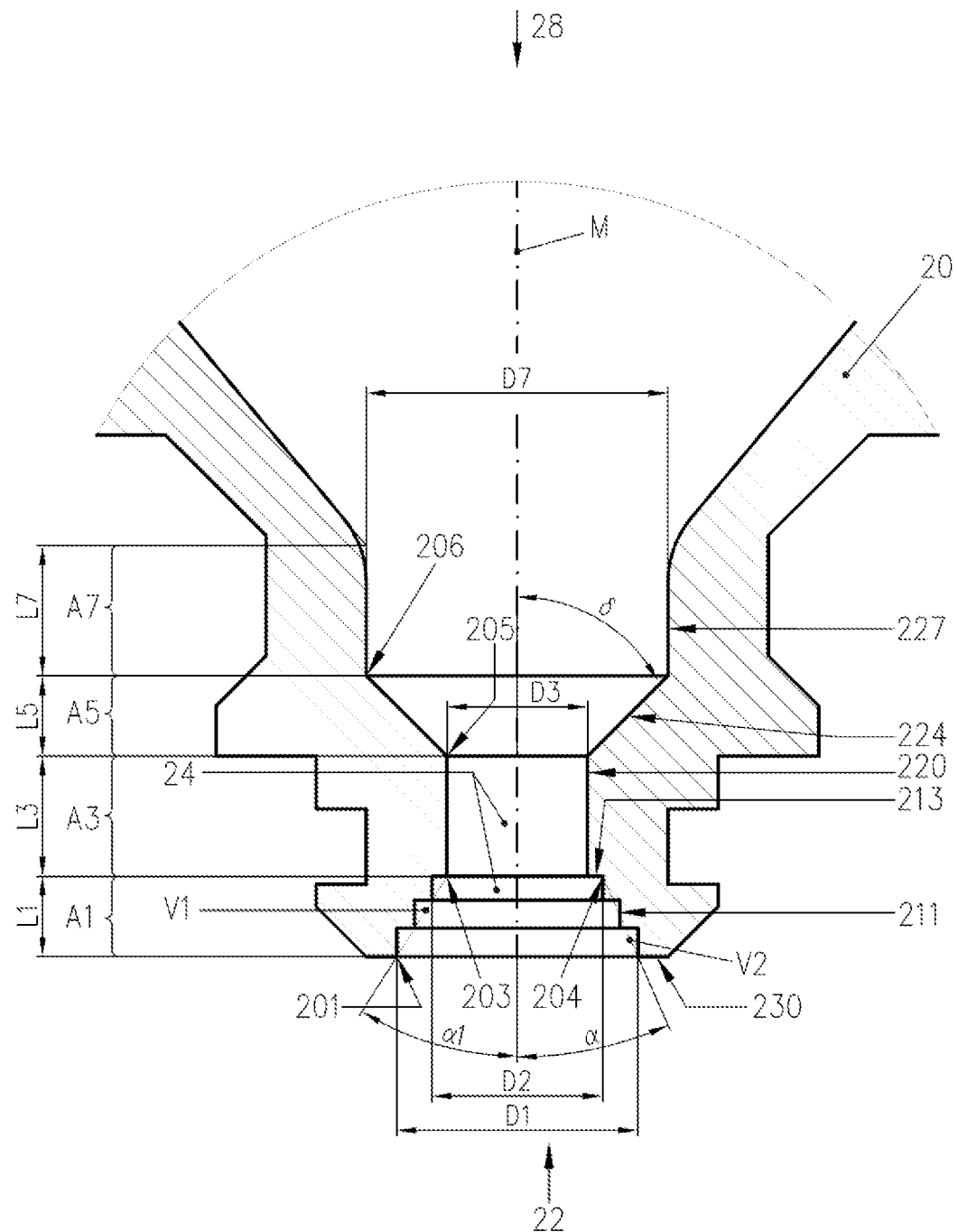
Figure 7:
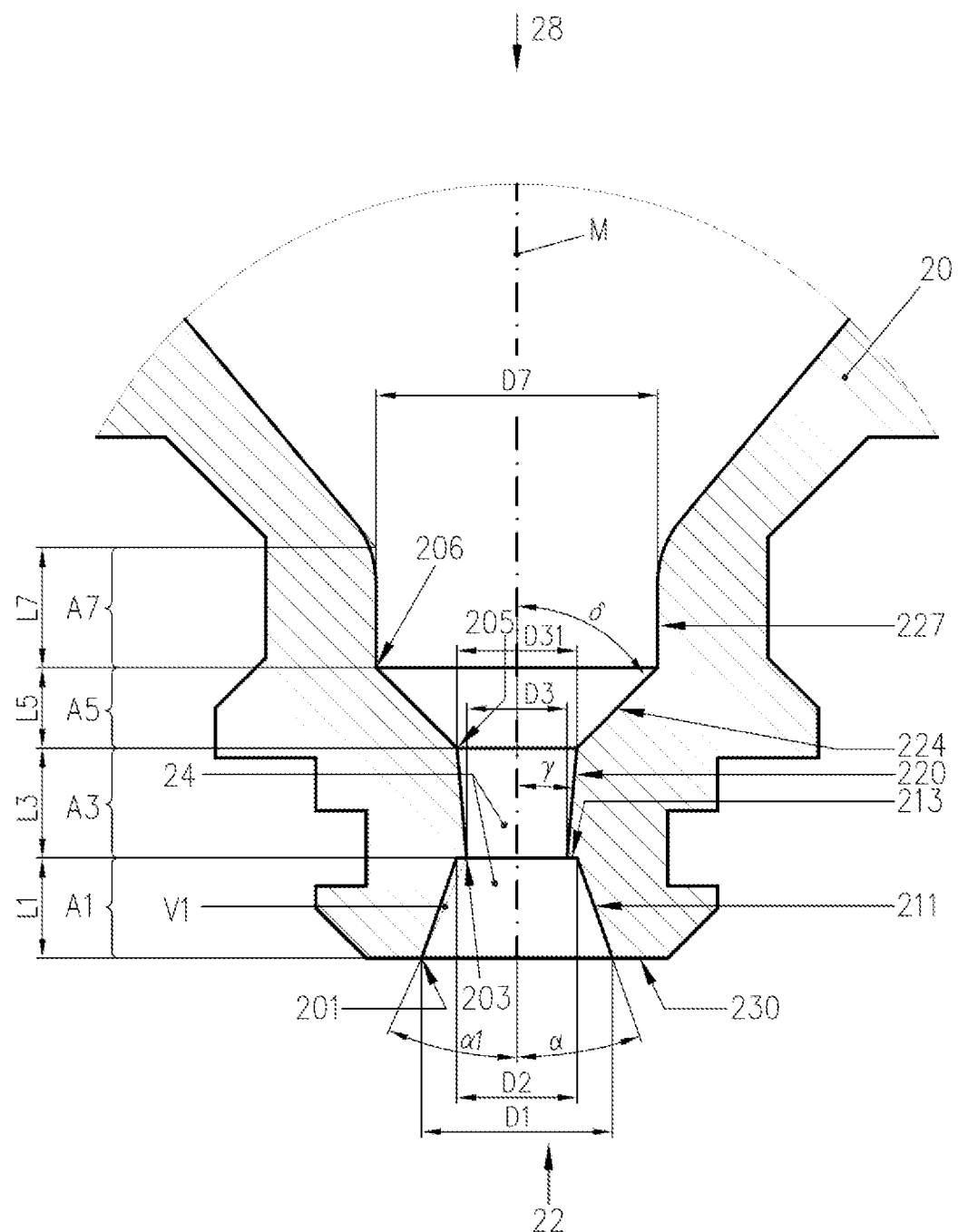
Figure 8:
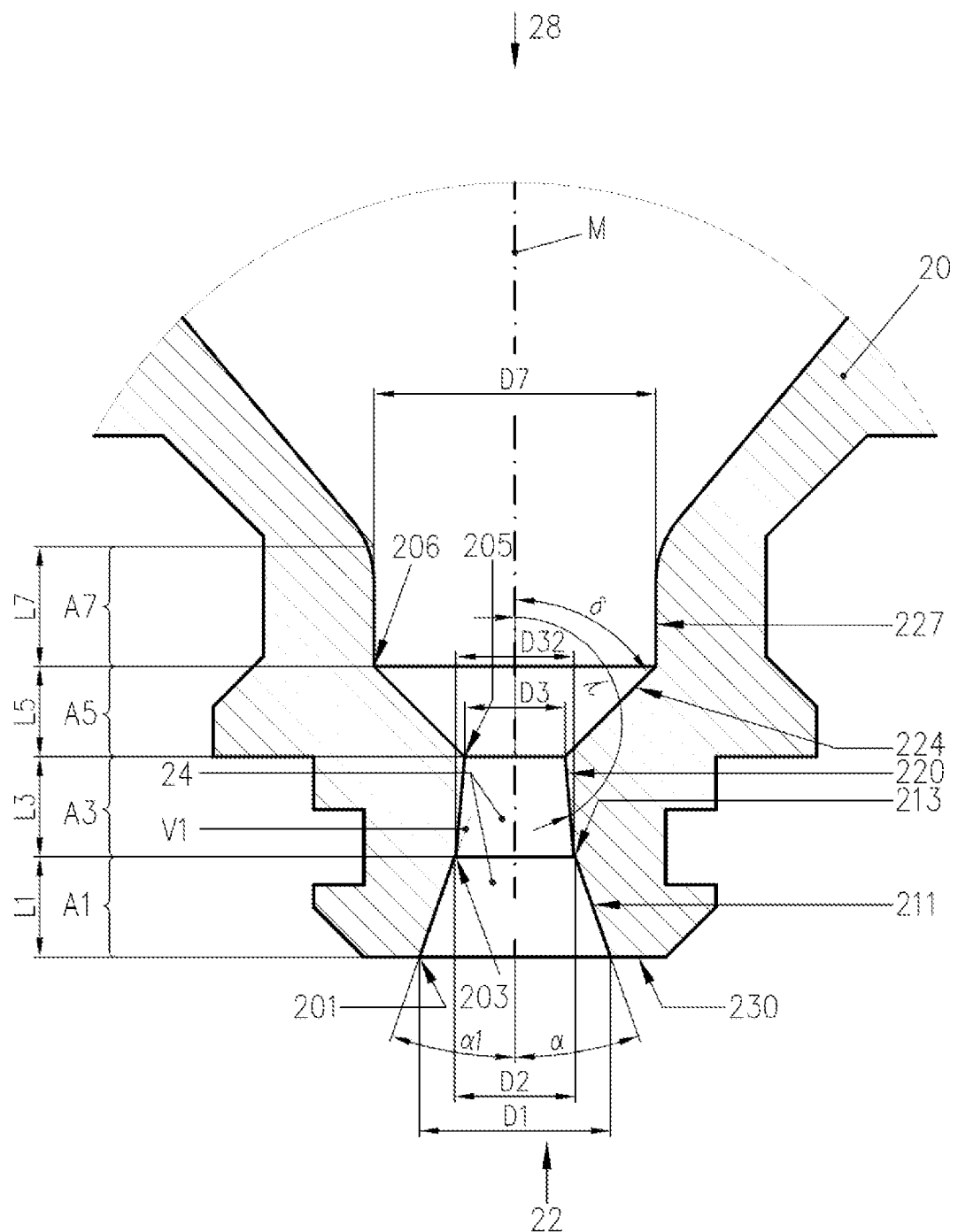
Figure 9:
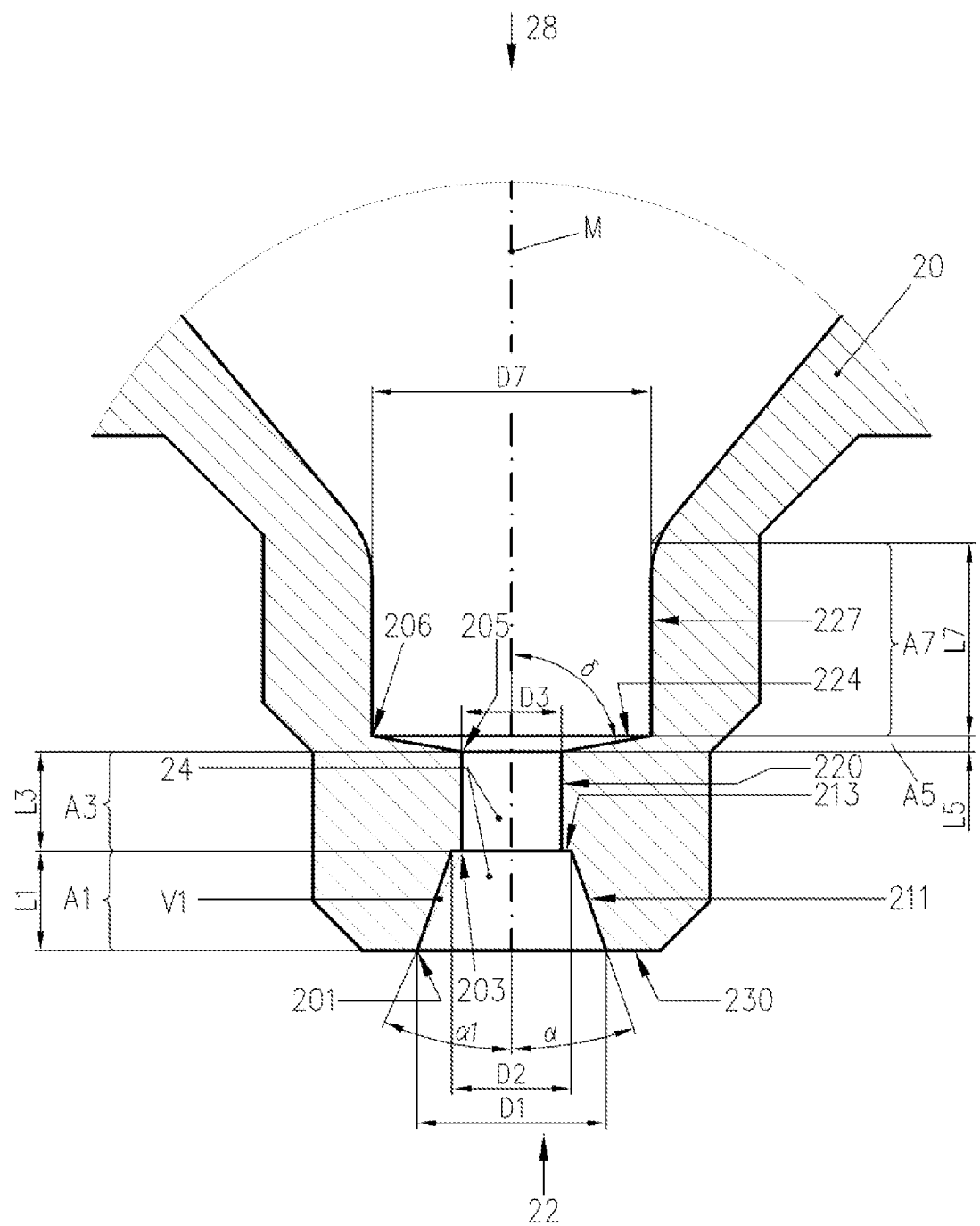
Figure 10:
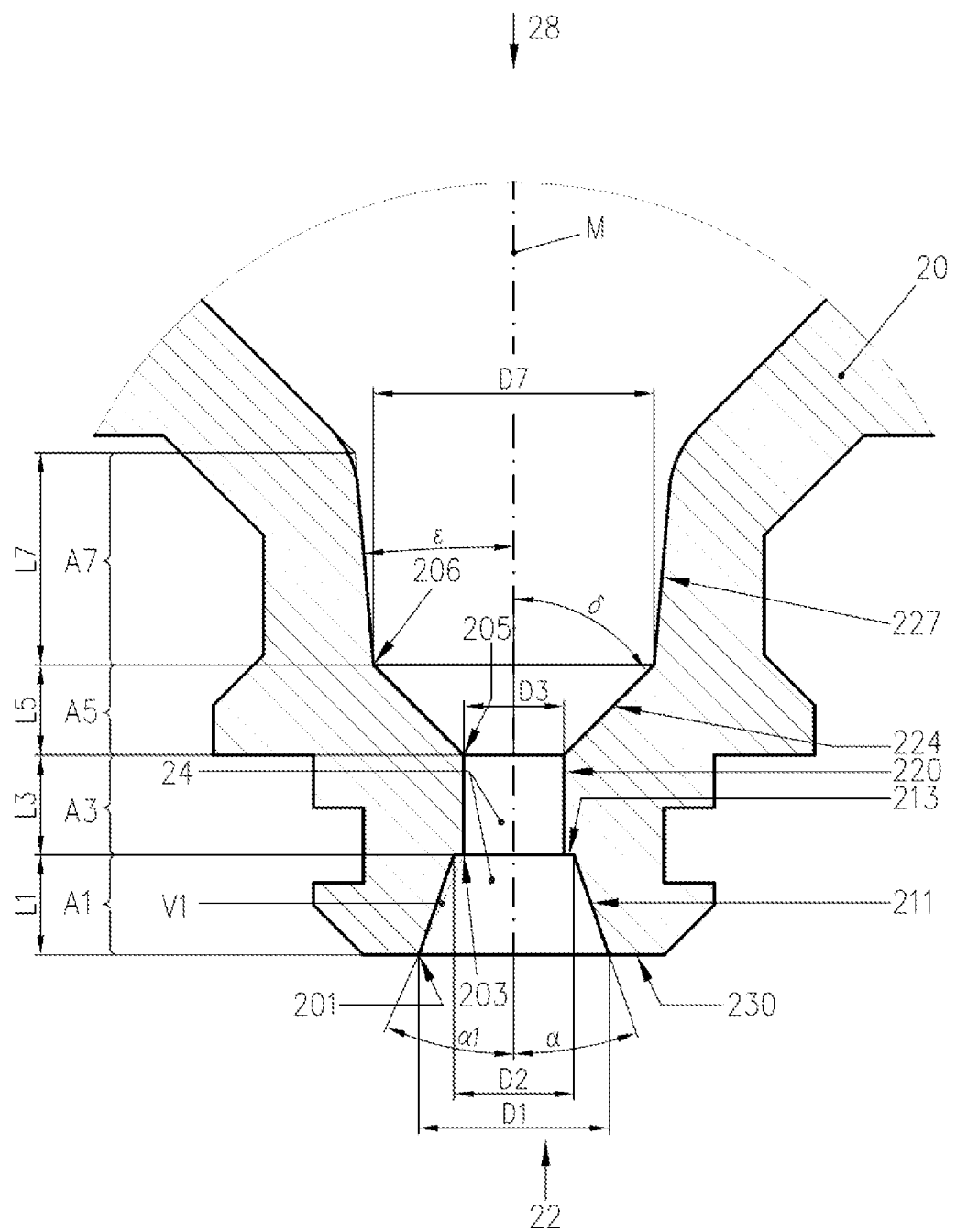
Figure 11:
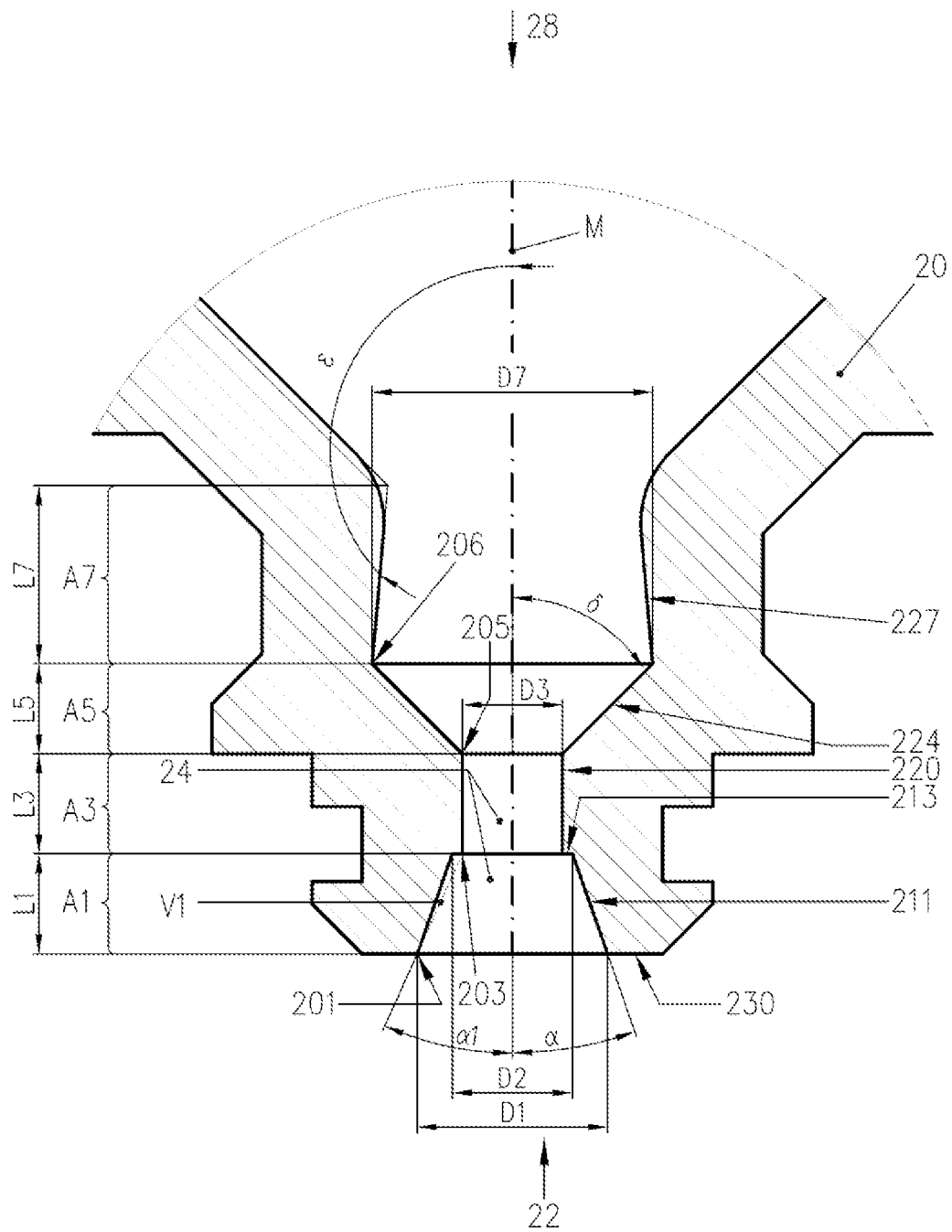
Figure 12:
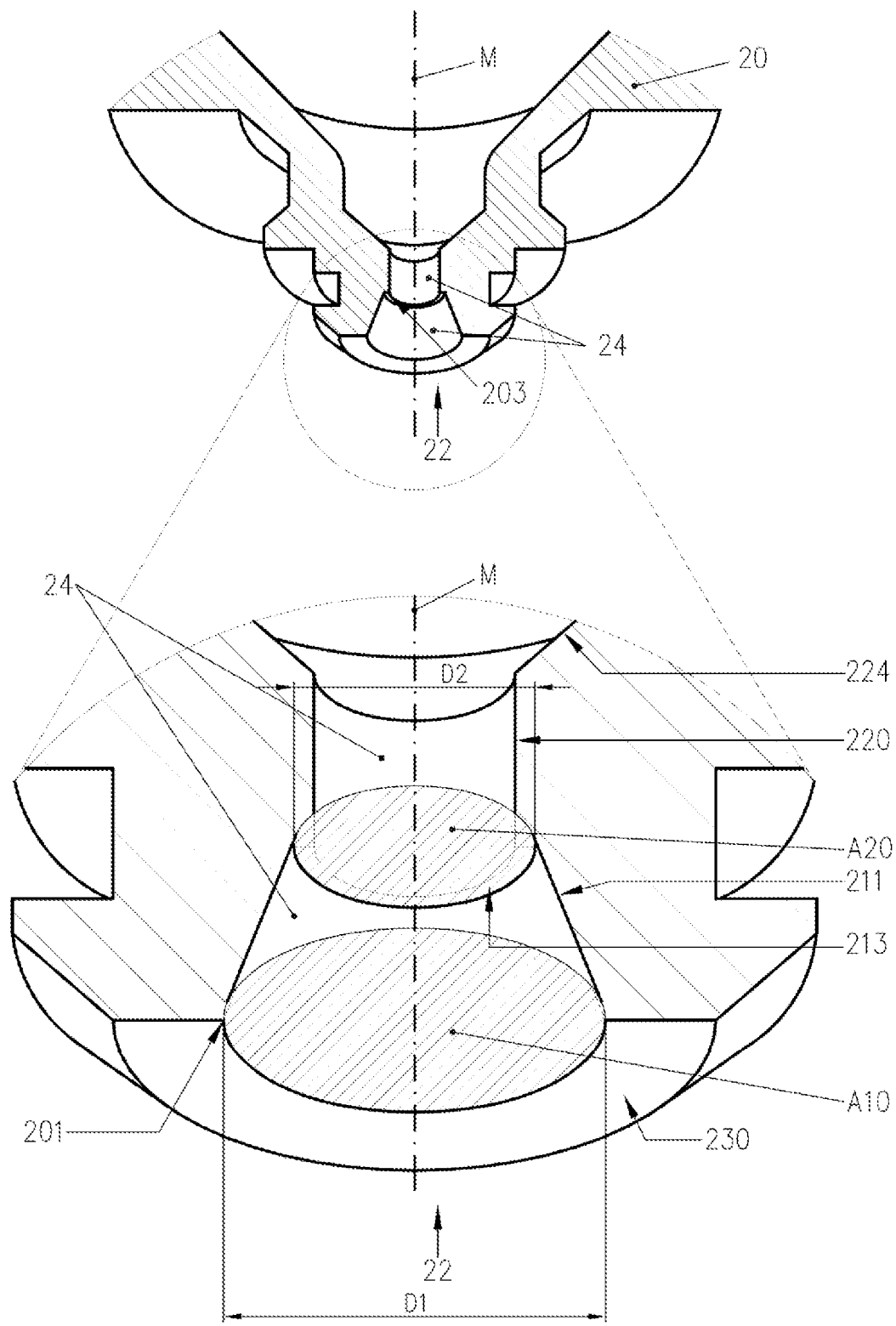
Figure 13:
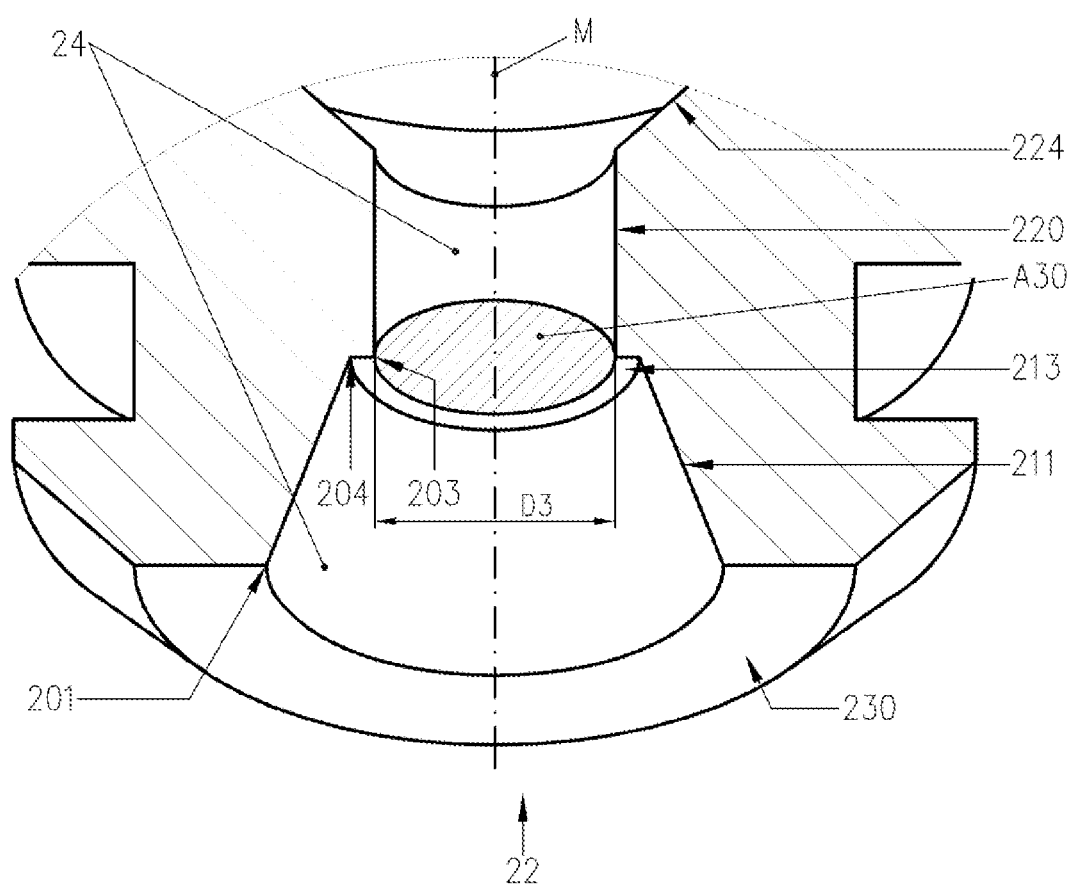
Figure 13A:
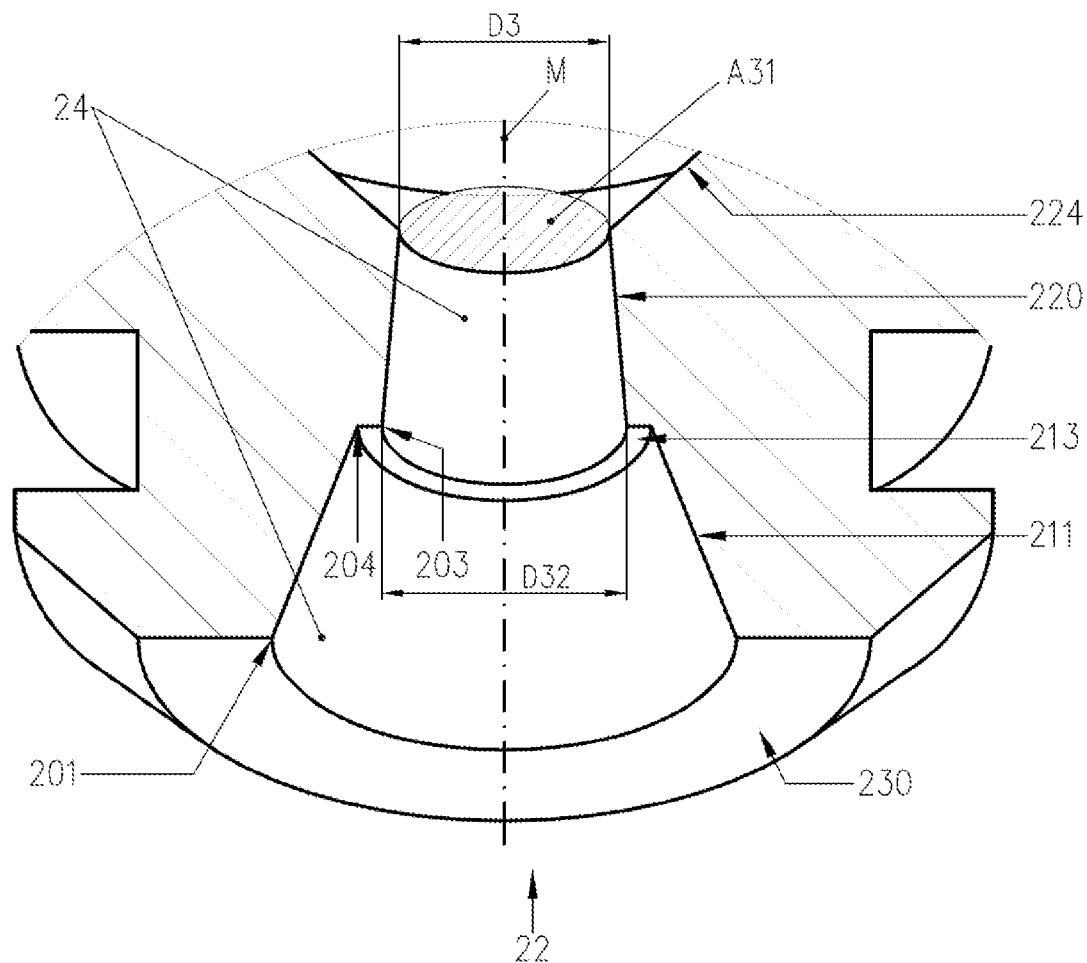
Figure 14:
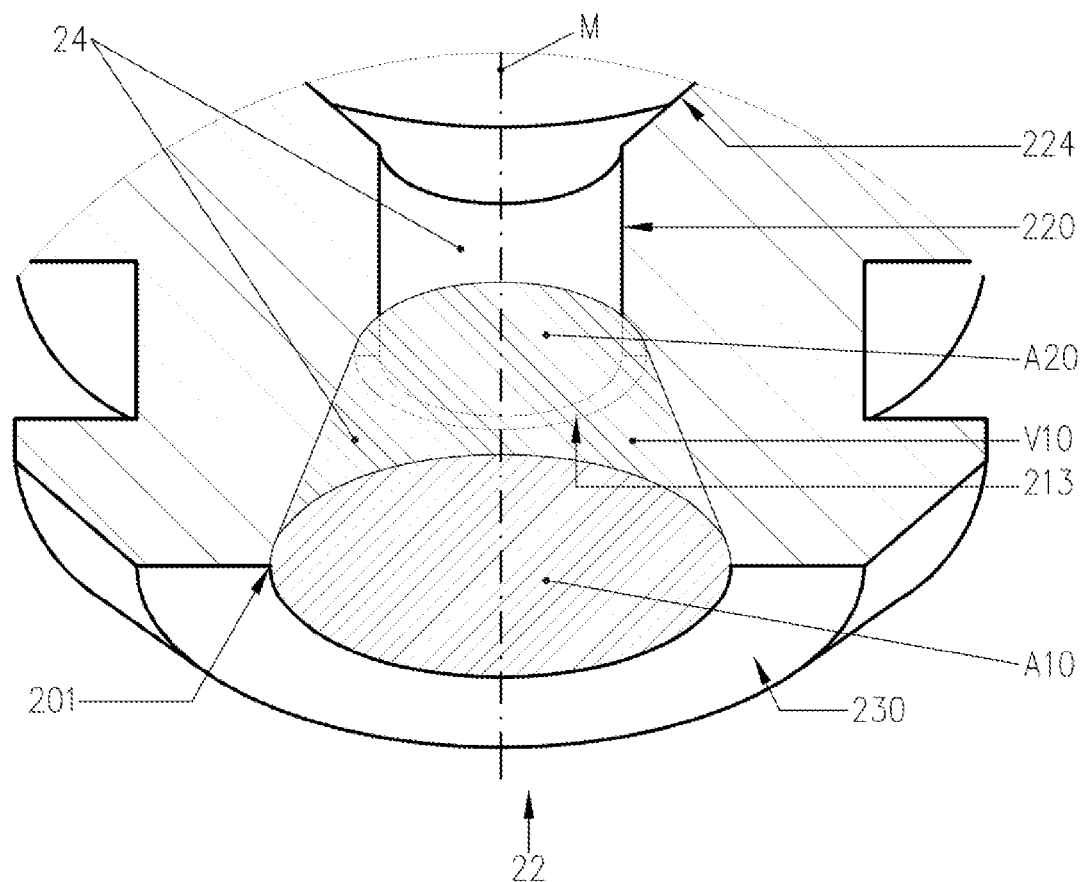
Figure 15:
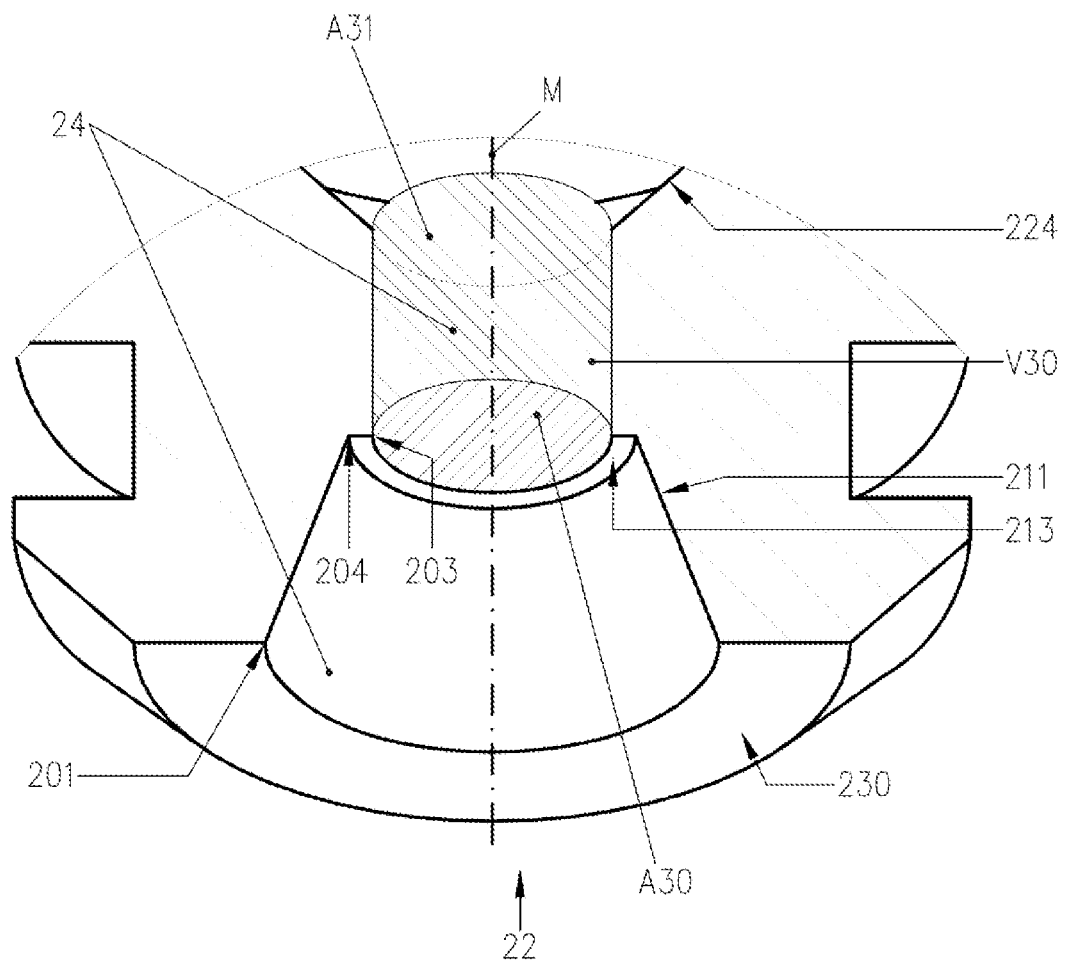
Figure 16:
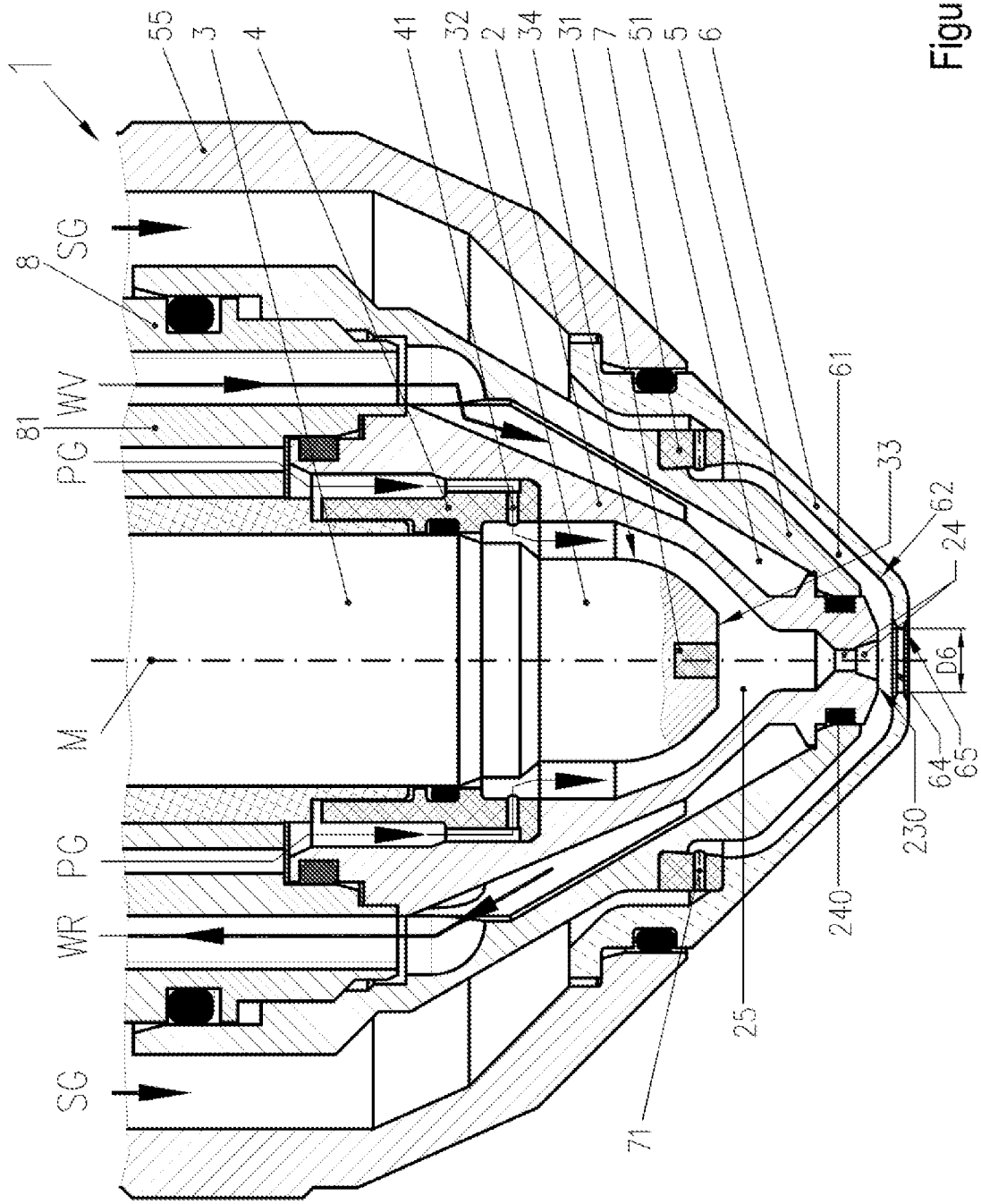
Figure 17:
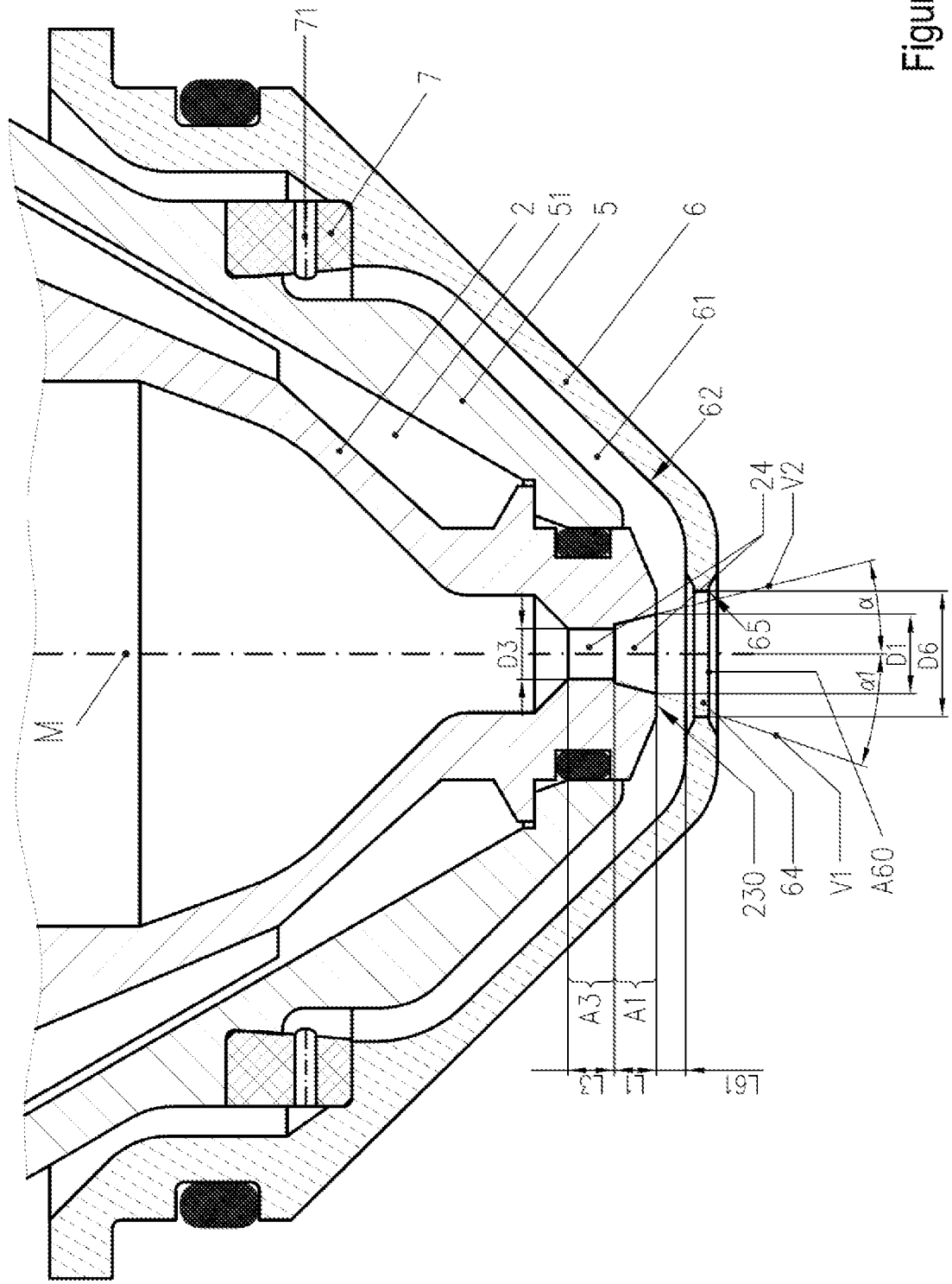
Figure 17A:
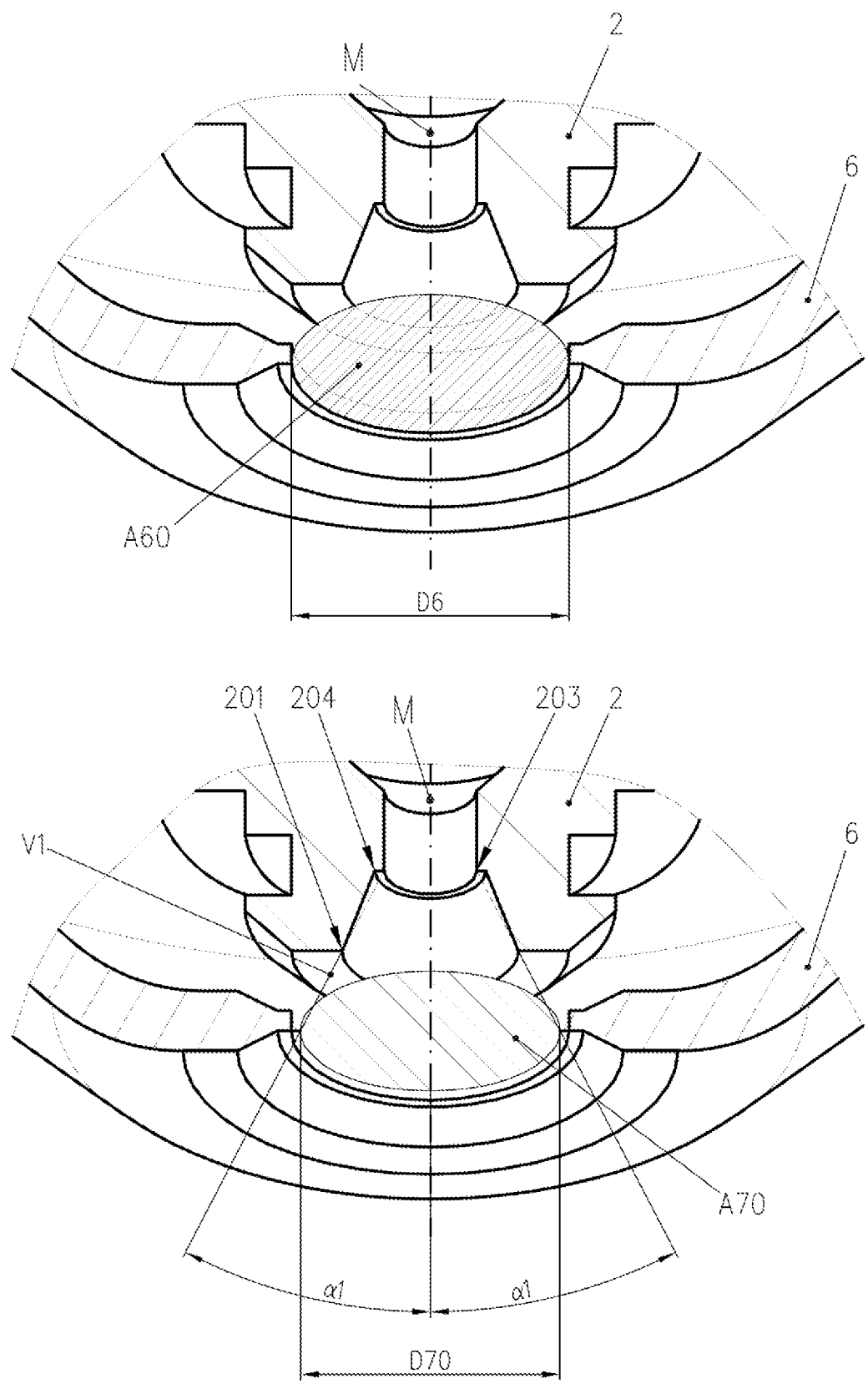
Figure 18:
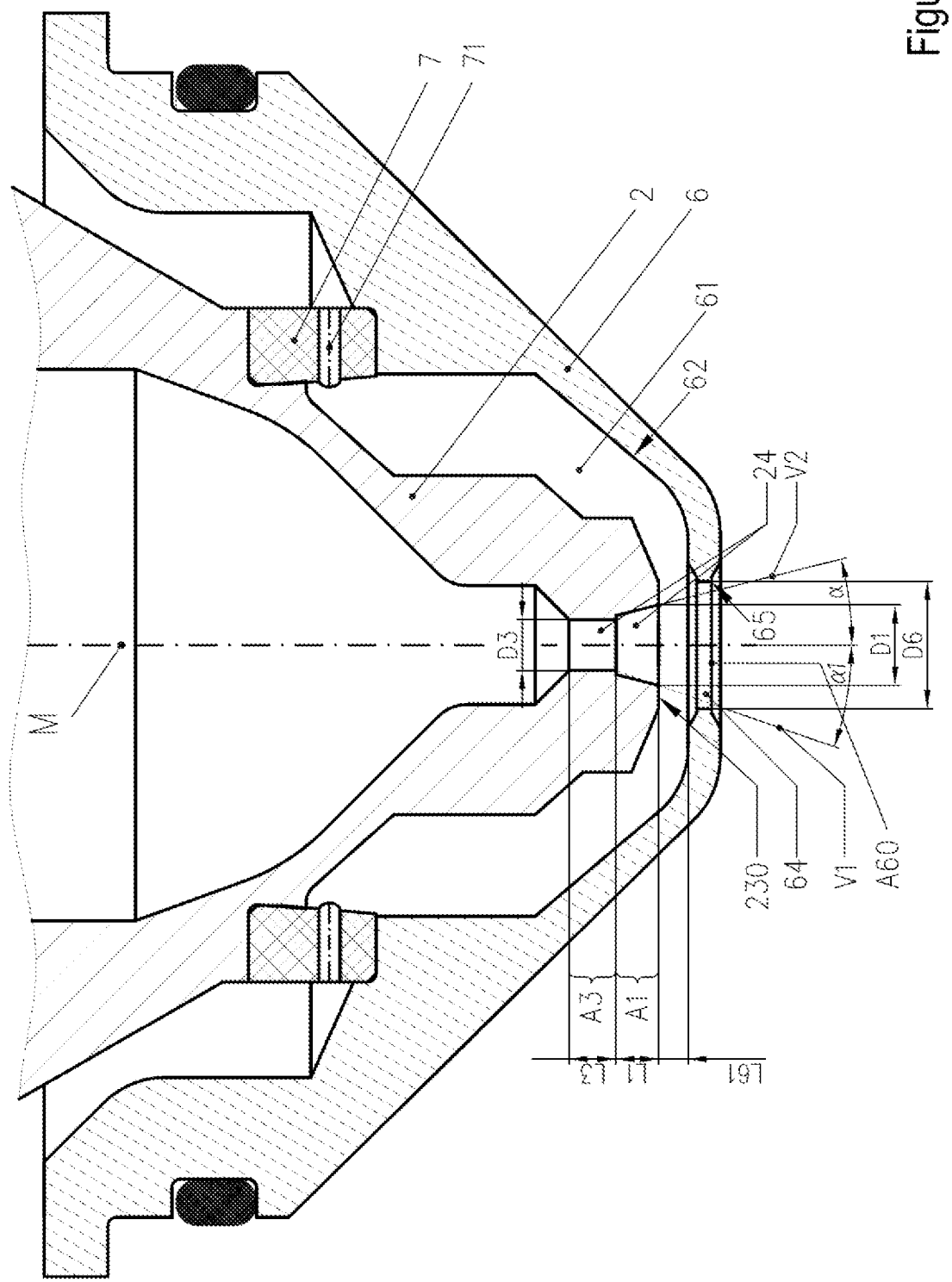
Figure 18A:
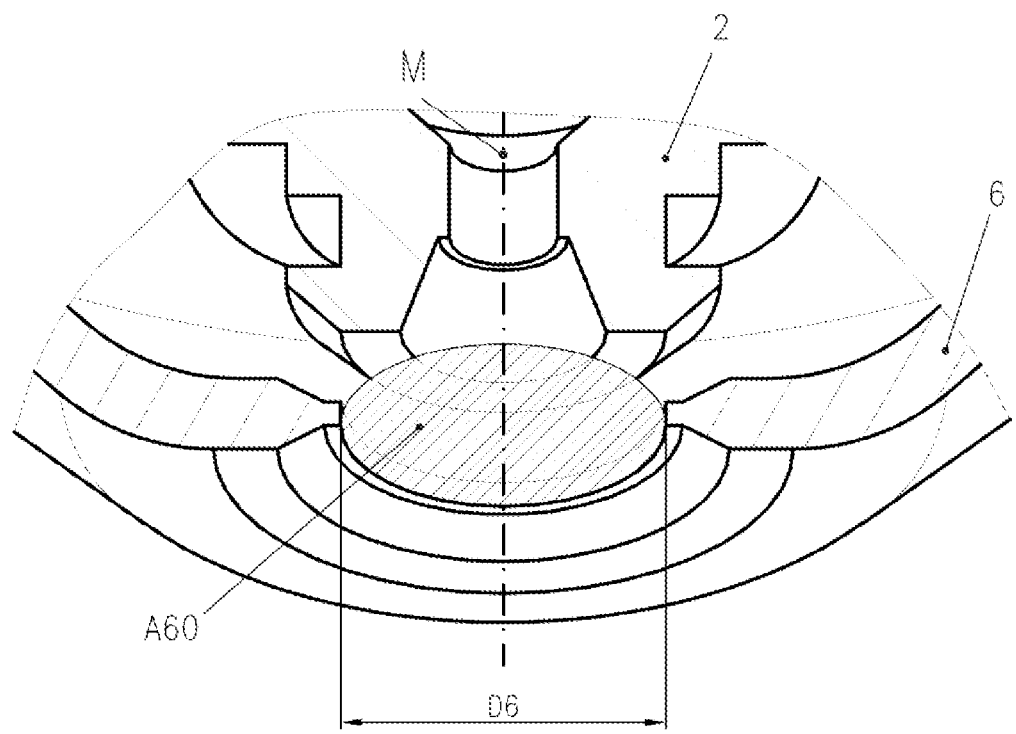
Figure 18A:
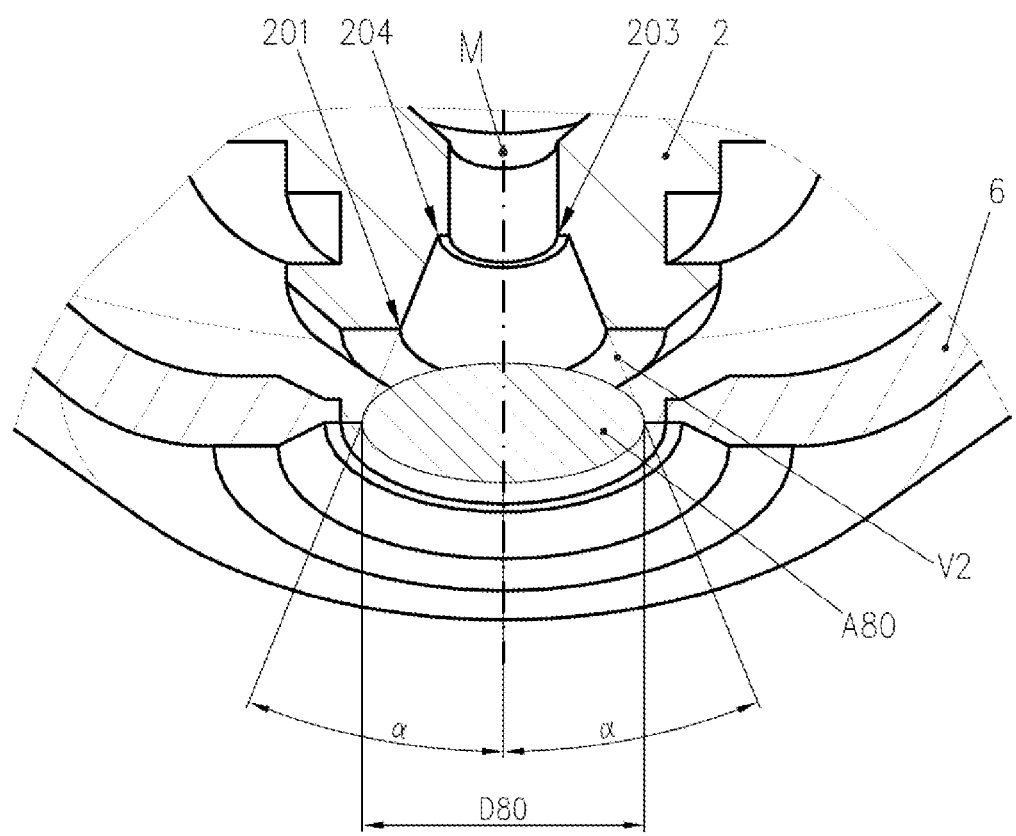
Figure 19:
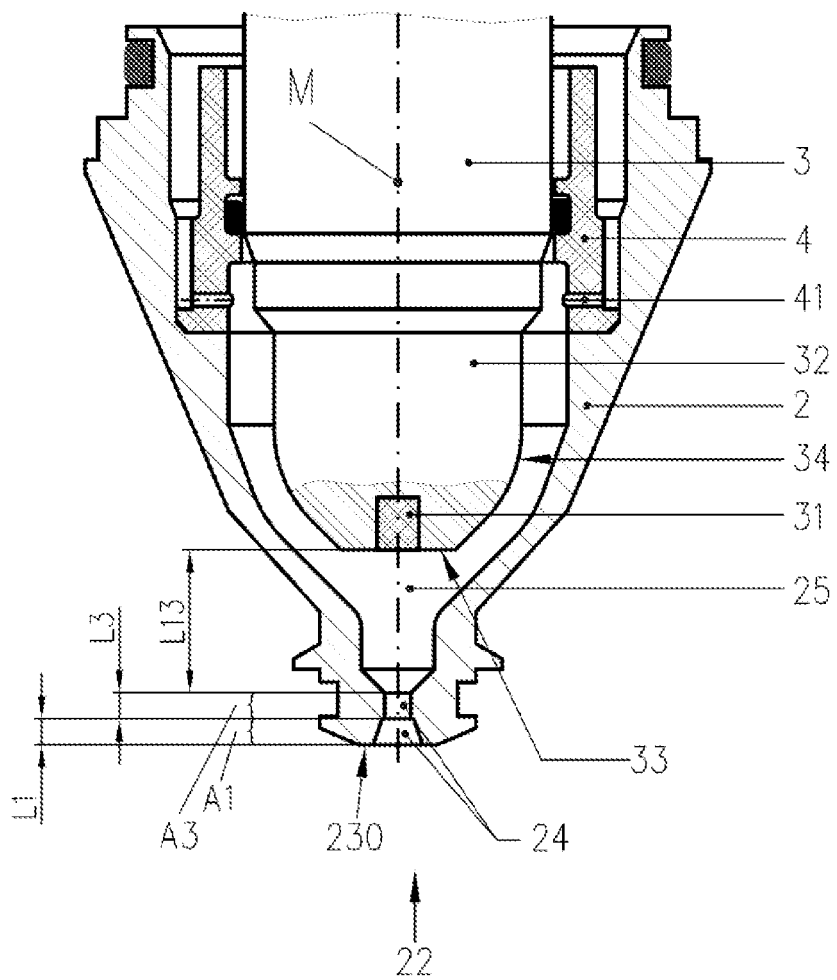
Figure 20:
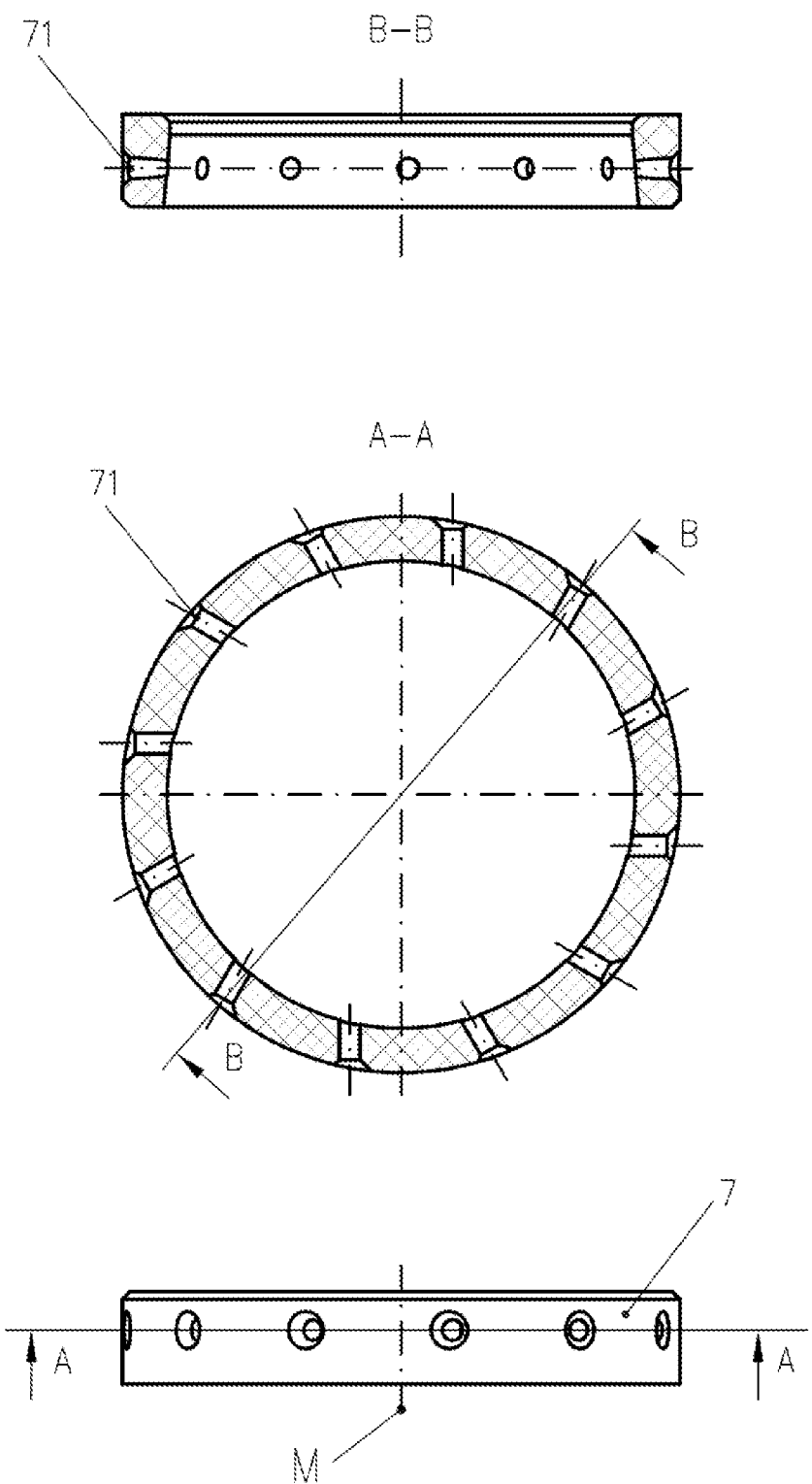
Figure 21:
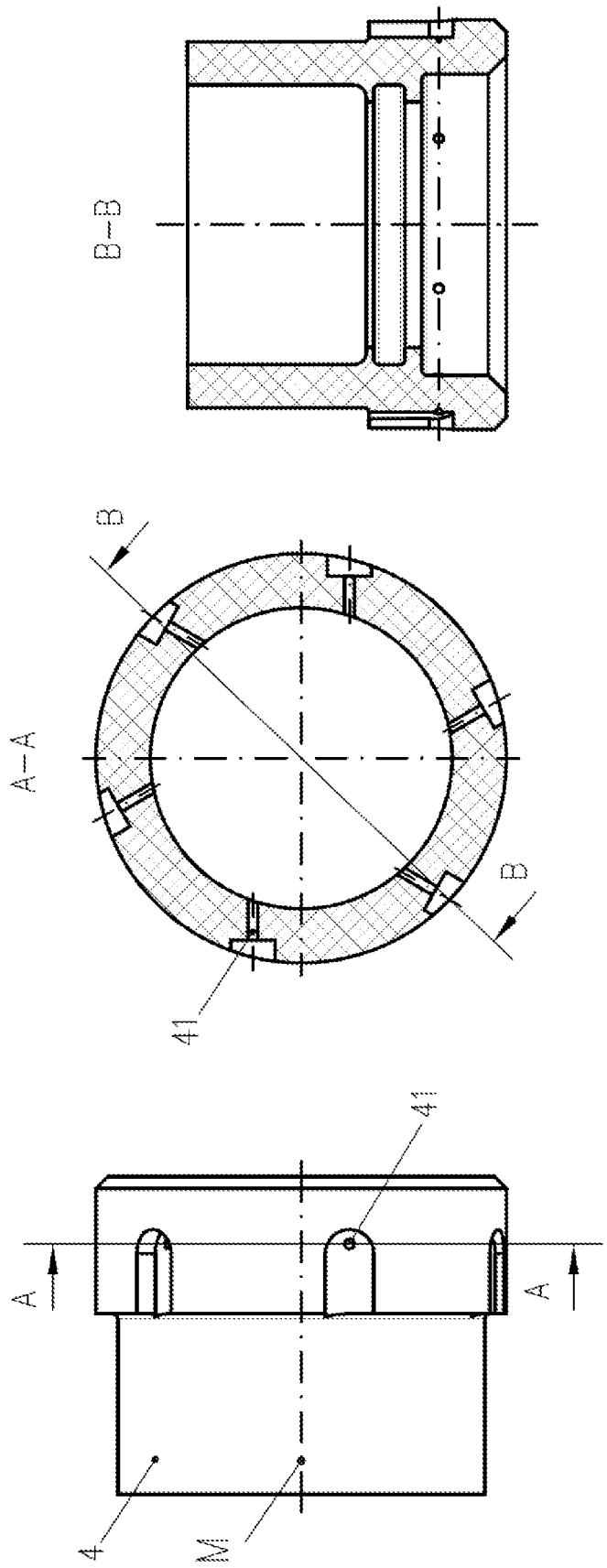

FIG. 5.1 shows a sectional detail view of the front end of a nozzle according to a particular embodiment of the invention (portion A1 narrowing in convex fashion, $\alpha 1=32°$);

FIG. 6 shows a sectional detail view of the front end of a nozzle according to a particular embodiment of the invention (portion A1 narrowing in stepped fashion, $\alpha 1=32°$);

FIG. 7 shows a sectional detail view of the front end of a nozzle according to a particular embodiment of the invention (portion A3 widening in conical fashion, $\gamma=5°$);

FIG. 7.1 shows a sectional detail view of the front end of a nozzle according to a particular embodiment of the invention (portion A3 widening in concave fashion, $\gamma 1=5°$);

FIG. 7.2 shows a sectional detail view of the front end of a nozzle according to a particular embodiment of the invention (portion A3 widening in convex fashion, $\gamma 1=5°$);

FIG. 8 shows a sectional detail view of the front end of a nozzle according to a particular embodiment of the invention (portion A3 narrowing in conical fashion, $\gamma=175°$);

FIG. 8.1 shows a sectional detail view of the front end of a nozzle according to a particular embodiment of the invention (portion A3 narrowing in convex fashion, $\gamma 1=175°$);

FIG. 8.2 shows a sectional detail view of the front end of a nozzle according to a particular embodiment of the invention (portion A3 narrowing in concave fashion, $\gamma 1=175°$);

FIG. 9 shows a sectional detail view of the front end of a nozzle according to a particular embodiment of the invention (portion A5 widening in conical fashion, $\delta=80°$);

FIG. 9.1 shows a sectional detail view of the front end of a nozzle according to a particular embodiment of the invention (portion A5 widening in concave fashion, $\delta 1=45°$);

FIG. 9.2 shows a sectional detail view of the front end of a nozzle according to a particular embodiment of the invention (portion A5 widening in convex fashion, $\delta 1=45°$);

FIG. 9.3 shows a sectional detail view of the front end of a nozzle according to a particular embodiment of the invention (portion A5 widening in concave fashion, $\delta 1=45°$);

FIG. 10 shows a sectional detail view of the front end of a nozzle according to a particular embodiment of the invention (portion A7 widening in conical fashion, $\epsilon=175°$);

FIG. 11 shows a sectional detail view of the front end of a nozzle according to a particular embodiment of the invention (portion A7 narrowing in conical fashion, $\epsilon=175°$);

FIG. 12 shows, by way of example, a sectional detail view and an enlarged sectional detail view (bottom) of the front end of a nozzle according to a particular embodiment of the invention for the purposes of illustrating the areas A10 and A20;

FIG. 13 and FIG. 13a show, by way of example, two enlarged sectional detail views of the front end of a nozzle according to a particular embodiment of the invention for the purposes of illustrating the areas A30 and A31;

FIG. 14 shows, by way of example, an enlarged sectional detail view of the front end of a nozzle according to a particular embodiment of the invention for the purposes of illustrating the volume V10;

FIG. 15 shows, by way of example, an enlarged sectional detail view of the front end 22 of the for the purposes of illustrating the volume V30;

FIG. 16 is a sectional illustration of a plasma torch head according to a particular embodiment of the invention;

FIG. 17 is a sectional illustration of an arrangement composed of a nozzle, of a nozzle cap, of a nozzle protection cap and of a gas-conducting unit according to a particular embodiment of the invention;

FIG. 17a shows an enlarged detail view of the arrangement composed of a nozzle and of a nozzle protection cap for the purposes of illustrating the projected circular area A70;

FIG. 18 is a sectional illustration of an arrangement composed of a nozzle, of a nozzle protection cap and of a gas-conducting unit according to a particular embodiment of the invention;

FIG. 18a shows an enlarged detail view of the arrangement composed of a nozzle and of a nozzle protection cap for the purposes of illustrating the projected circular area A80;

FIG. 20 shows, by way of example, a gas-conducting unit for secondary gas;

FIG. 19 is a sectional illustration of an arrangement composed of a nozzle, of an electrode and of a gas-conducting unit according to a particular embodiment of the invention;

FIG. 21 shows, by way of example, a gas-conducting unit for plasma gas.

Figure 1:
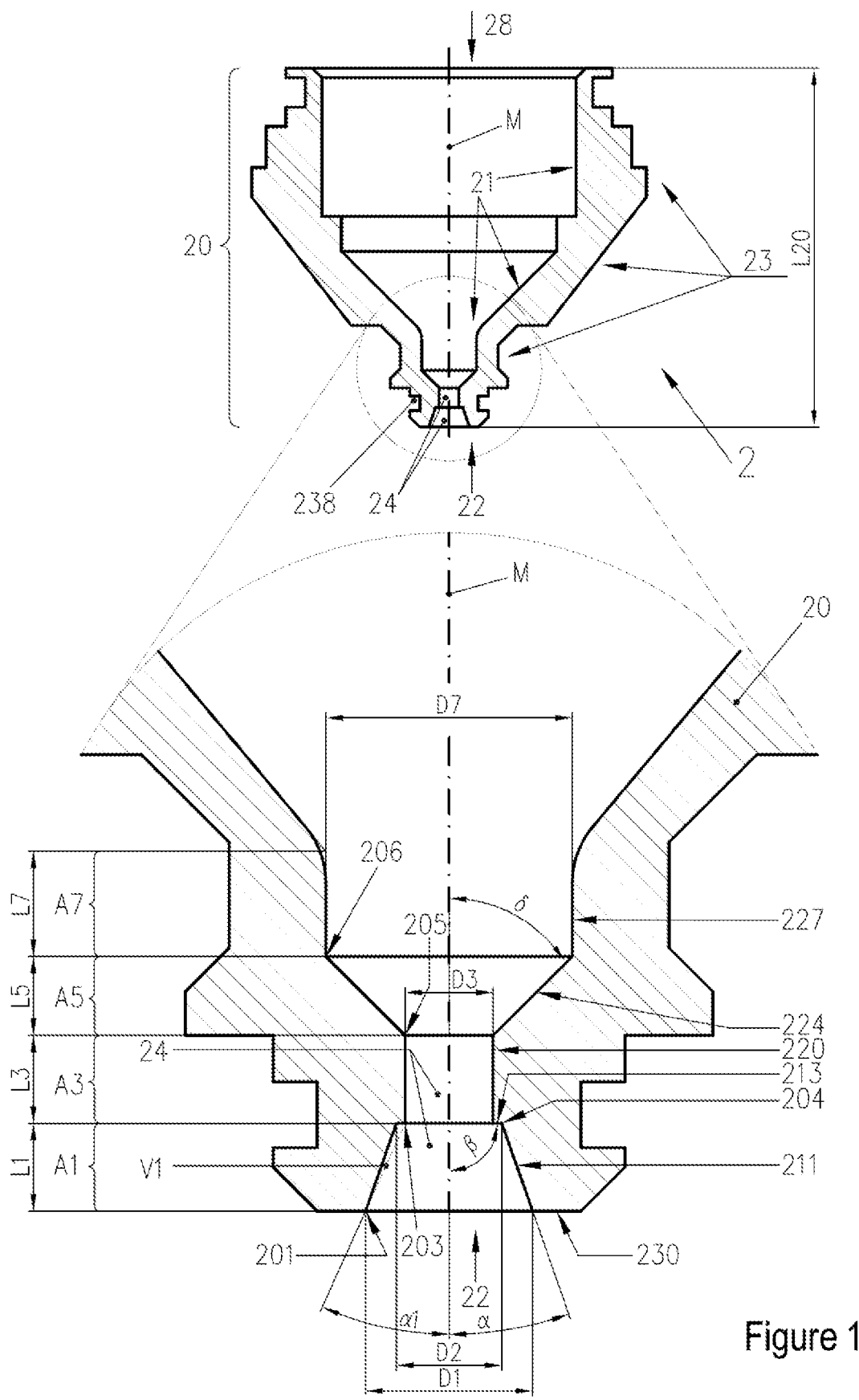
FIG. 1 shows a sectional view and a sectional detail view (top) of the front end of a nozzle according to a particular embodiment of the invention.

The nozzle 2 shown in FIG. 1 in a sectional view (top) and in a sectional detail view (bottom) for a plasma arc torch comprises a body 20 with an overall length L20, which extends along a longitudinal axis M, with an inner surface 21 and with an outer surface 23, with a front end 22 and with a rear end 28, and with a nozzle opening 24 at the front end 22. Furthermore, the body 20 has, at its front end 22, a groove 238. When the nozzle 2 is installed in the plasma arc torch, a round ring 240 (see FIG. 16) is situated in the groove 238 for the purposes of sealing off the space between nozzle 2 and nozzle cap 5 (see FIG. 16).

The inner surface 21 of the body 20 of the nozzle 2 has, proceeding from the front end 22 (nozzle opening 24), a first portion A1 which extends along the longitudinal axis M and which firstly narrows in conical fashion with an angle $\alpha$ between its inner surface 211 and the longitudinal axis M, in this case by way of example approximately 19°, over a length L1, for example 1.0 mm, and then has a projection in the direction of the longitudinal axis M, which, between its inner surface 213 and the longitudinal axis M, forms an angle $\beta$, in this case for example 90°. The nozzle opening 24 has, directly at the front end 22, a diameter D1, in this case for example 1.9 mm, and, at the end of the conical region of the inner surface 211 of the first portion A1, a diameter D2, in this case for example 1.2 mm. Owing to the projection, in this case for example 0.1 mm, the diameter of the nozzle opening 24 then decreases to D3, in this case for example 1.0 mm.

This is directly adjoined by the second portion A3 with the diameter D3 and a length L3, for example 1.0 mm, which second portion has a cylindrical inner surface 220. Said portion is adjoined by the third portion A5, the inner surface 224 of which widens conically with an angle $\delta$ between its inner surface 224 and the longitudinal axis M, in this case for example 45°, from the diameter D3 to the diameter D7, in this case for example 2.8 mm. Said portion extends along the longitudinal axis M over the length L5, in this case for example 0.9 mm. It is adjoined by the fourth portion A7 with the diameter D7, which has a cylindrical inner surface 227 with a length L7, for example 1.2 mm. This is adjoined by a further region which widens conically.

With D1=1.9 mm and D3=1.0 mm, D1 amounts to 1.9 times the diameter D3. The diameter D1 is 0.9 mm larger than the diameter D3.

The area A10 formed perpendicular to the longitudinal axis M by the diameter D1 of the first portion A1 directly at the front end 22 of the nozzle opening 24, which area is illustrated in FIG. 12, amounts to approximately 2.8 mm², determined in accordance with $$[A10=3.141/4*D1^2].$$

The area A30 formed perpendicular to the longitudinal axis M by the smallest diameter D3 of the second portion A3 of the nozzle opening 24, which area is illustrated in FIG. 13, amounts to approximately 0.8 mm², determined in accordance with $$[A30=3.141/4*D3^2].$$

The area A10 therefore amounts to approximately 3.6 times the area A30.

The length L1=1.0 mm of the first portion A1 and the length L3=1.0 mm A3 of the second portion result in a ratio of L1/L3=1. The quotient of the length L3 and of the diameter D3 of the second portion A3 likewise amounts to 1. Furthermore, the diameter D1=1.9 mm is smaller than the diameter D7=2.8 mm.

FIG. 1 furthermore shows a virtual connecting line V1 which extends between the body edge 201 of the nozzle opening 24 with the diameter D1 at the front end 22 and the body edge 203 at the transition from the first portion A1 to the second portion A3 of the nozzle opening 24 with the diameter D3. The angle $\alpha1$ enclosed by the connecting line V1 and the longitudinal axis M amounts to approximately 24°.

The volume V10, formed by the inner surfaces 211 and 213, of the nozzle opening 24 of the first portion A1 amounts to approximately 1.9 mm³, calculated in accordance with $$[V10=3.141*L1/3*((D1/2)^2+(D1/2*D2/2)+(D2/2)^2].$$

The volume V30, formed by the inner surface 220, of the nozzle opening 24 of the second portion A3 amounts to approximately 0.8 mm³, calculated in accordance with $[V30=3.141*(D3/2)^2*L3]$. Volume V10 is thus approximately 1.9 times larger than volume V30.

Figure 2:
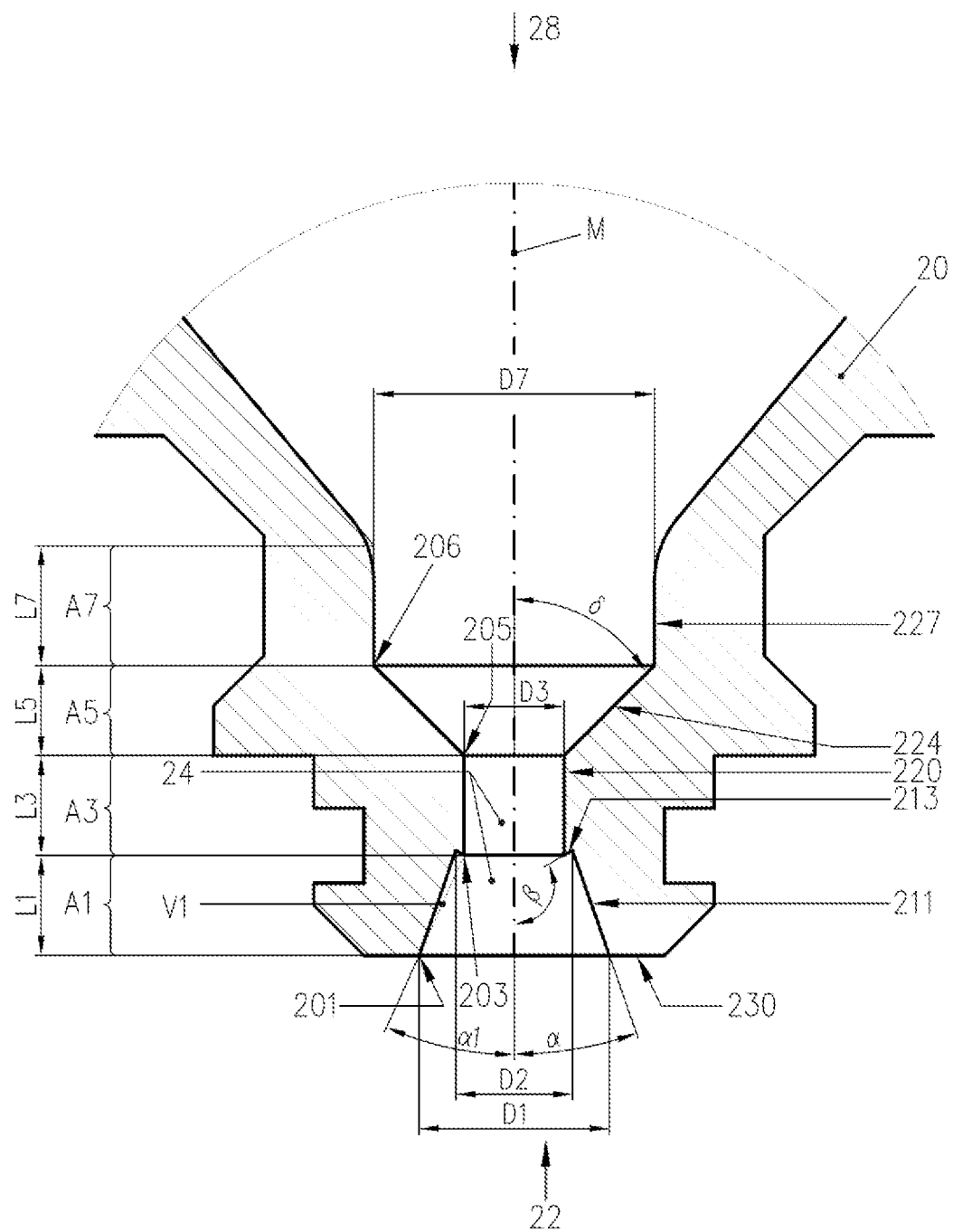
FIG. 2 shows a sectional detail view of the front end of a nozzle according to a particular embodiment of the invention (angle $\beta=120°$)

FIG. 2 shows the detail view of a further exemplary embodiment of a nozzle 2 similar to FIG. 1. Said nozzle differs from that in FIG. 1 in that the projection in the direction of the longitudinal axis M, which forms an angle $\beta=100°$ between its inner surface 213 and the longitudinal axis M.

Figure 3:
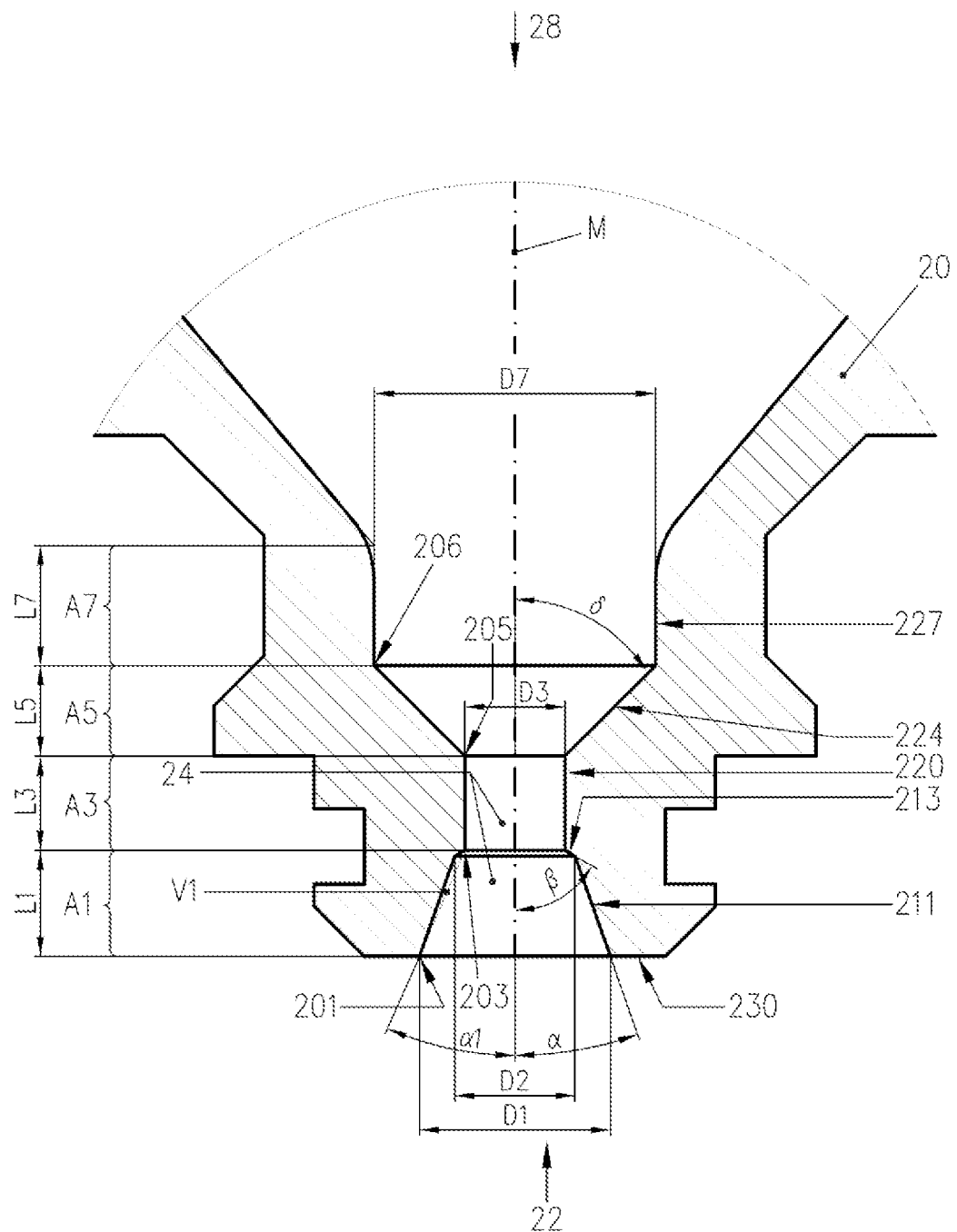
FIG. 3 shows a sectional detail view of the front end of a nozzle according to a particular embodiment of the invention (angle $\beta=60°$.

FIG. 3 shows the detail view of a further exemplary embodiment of a nozzle 2 similar to FIG. 1. Said nozzle differs from that in FIG. 1 in that the projection in the direction of the longitudinal axis M, which forms an angle $\beta=60°$ between its inner surface 213 and the longitudinal axis M.

Figure 4:
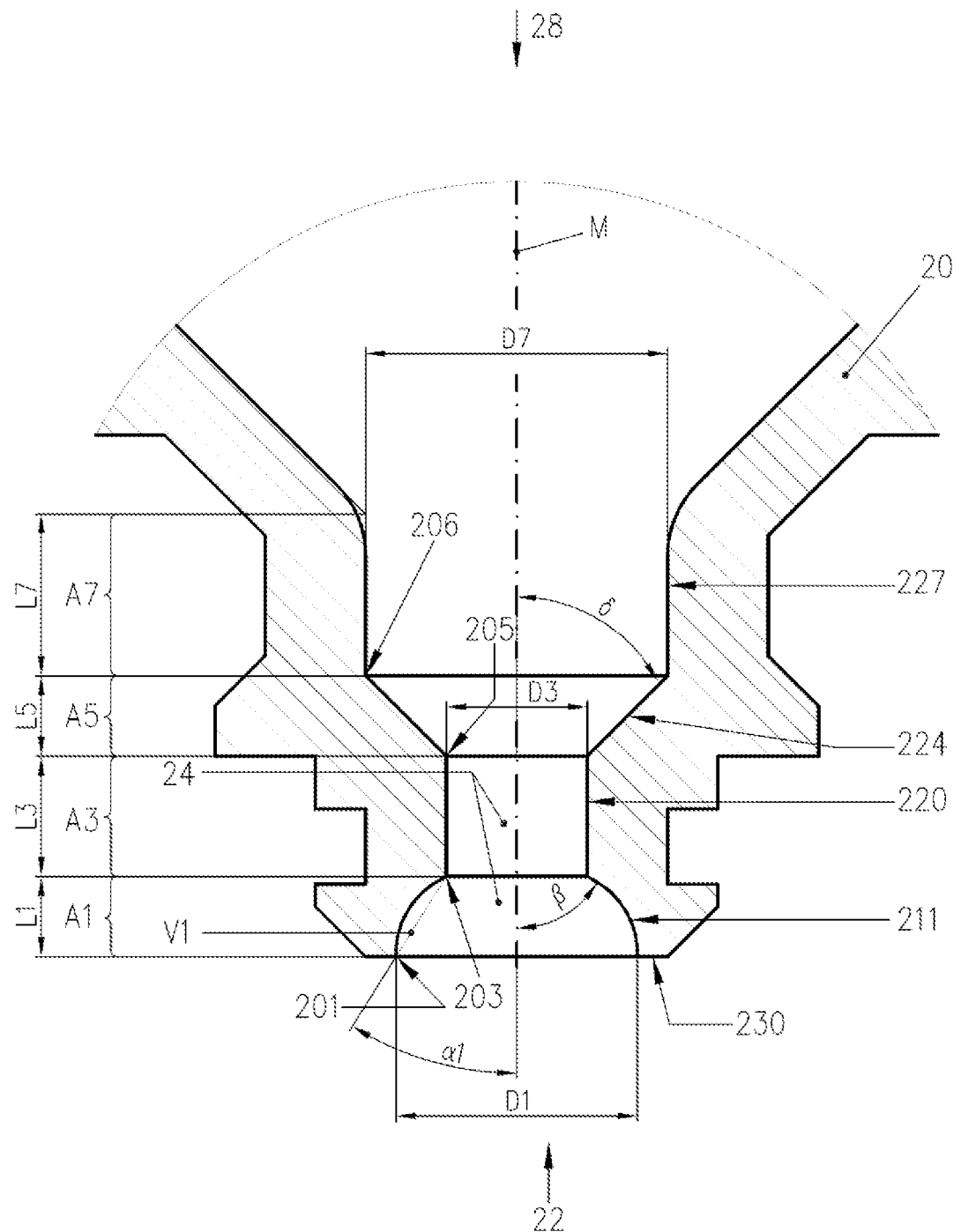
FIG. 4 shows a sectional detail view of the front end of a nozzle according to a particular embodiment of the invention (portion A1 narrowing in concave fashion, $\alpha 1=32°$)

FIG. 4 shows the detail view of a further exemplary embodiment of a nozzle 2 similar to FIG. 1. Said nozzle differs from that in FIG. 1 in that the first portion A1 has, proceeding from the front end, an inner surface 211 which narrows in concave fashion. The virtual connecting line V1 that extends between the body edge 201 of the nozzle opening 24 with the diameter D1 at the front end 22 and the body edge 203 at the transition from the first portion A1 to the second portion A3 of the nozzle opening 24 with the diameter D3 encloses for example an angle $\alpha1$ of approximately 32° with the longitudinal axis M. The diameter D1 amounts in this case to for example 2.4 mm, the diameter D3=1.4 mm, and thus the diameter D1 amounts to approximately 1.7 times the diameter D3.

The area A10 formed perpendicular to the longitudinal axis M by the diameter D1 of the first portion A1 directly at the front end 22 of the nozzle opening 24, which area is illustrated in FIG. 12, amounts to approximately 4.5 mm², determined in accordance with $$[A10=3.141/4*D1^2].$$

The area A30 formed perpendicular to the longitudinal axis M by the smallest diameter D3 of the second portion A3 of the nozzle opening 24, which area is illustrated in FIG. 13, amounts to approximately 1.5 mm², determined in accordance with $$[A30=3.141/4*D3^2].$$

The area A10 therefore amounts to approximately 2.9 times the area A30.

The length L1 amounts to for example 0.8 mm, and the length L3 for example to 1.2 mm, and thus the length L1 amounts to 0.67 times the length L3.

The quotient of the length L3=1.2 mm and of the diameter D3=1.4 mm of the second portion A3 amounts to 0.86. Furthermore, the diameter D1=2.4 mm is smaller than the diameter D7=3.0 mm.

The volume V10, formed by the inner surface 211, of the nozzle opening 24 of the first portion A1 amounts to approximately 2.3 mm³. The volume V30, formed by the inner surface 220, of the nozzle opening 24 of the second portion A3 amounts to approximately 1.8 mm³. Volume V10 is thus approximately 1.3 times larger than volume V30.

FIG. 5 shows the detail view of a further exemplary embodiment of a nozzle 2 similar to FIG. 4. Said nozzle differs from that in FIG. 1 in that the first portion A1 has, proceeding from the front end, an inner surface 211 which narrows in convex fashion. The virtual connecting line V1 that extends between the body edge 201 of the nozzle opening 24 with the diameter D1 at the front end 22 and the body edge 203 at the transition from the first portion A1 to the second portion A3 of the nozzle opening 24 with the diameter D3 encloses for example an angle α1 of approximately 32° with the longitudinal axis M. The diameter D1 amounts in this case to for example 2.4 mm, and the diameter D3 to 1.4 mm, and thus the diameter D1 amounts to approximately 1.7 times the diameter D3. The length L1 amounts to for example 0.8 mm, and the length L3 for example to 1.2 mm, and thus the length L1 amounts to approximately 0.67 times the length L3.

The quotient of the length L3=1.2 mm and of the diameter D3=1.4 mm of the second portion A3 amounts to approximately 0.86. Furthermore, the diameter D1=2.4 mm is smaller than the diameter D7=3.0 mm.

The exemplary specifications from FIG. 4 apply to the areas A10 and A30, and the same applies to the specifications of the volumes V10 and V30.

If the body edge 201 is not clearly recognizable as such, for example because the convex inner surface 211 merges in continuous or "flowing" fashion into the surface 230, then the region of the inner surface(s) with body edge is meant if, as viewed from the rear end 28 of the nozzle 2, an angle α2 of 65° is exceeded between a tangent T applied to the inner surface 211 and the longitudinal axis M. The virtual connecting line V1 then extends between said region and body edge 203. This is shown in FIG. 5.1.

FIG. 6 shows a further exemplary embodiment of a nozzle 2 similar to FIG. 4. Said nozzle differs from that in FIG. 4 in that the first portion A1 has, proceeding from the front end, an inner surface 211 which narrows in stepped fashion. The virtual connecting line V1 that extends between the body edge 201 of the nozzle opening 24 with the diameter D1 at the front end 22 and the body edge 203 at the transition from the first portion A1 to the second portion A3 of the nozzle opening 24 with the diameter D3 encloses for example an angle α1 of approximately 32° with the longitudinal axis M. The diameter D1 amounts in this case to for example 2.4 mm, the diameter D3=1.4 mm, and thus the diameter D1 amounts to 1.7 times the diameter D3. The length L1=0.8 mm of the first portion A1 and the length L3=1.2 mm A3 of the second portion result in a ratio of L1/L3=0.67. The quotient of the length L3 and of the diameter D3 of the second portion A3 amounts to approximately 0.86. The diameter D7 amounts to for example 3.0 mm. Thus, the diameter D1=2.4 mm is smaller than the diameter D7=3.0 mm.

The exemplary specifications from FIG. 4 apply to the areas A10 and A30, and the same applies to the specifications of the volumes V10 and V30.

FIG. 7 shows the detail view of a further exemplary embodiment of a nozzle 2 similar to FIG. 1. The dimensions are identical to those from FIG. 1. Only the second portion A3 is designed such that, as viewed from the front end 22 of the nozzle 2, its inner surface 220 widens at an angle γ of for example 5° with respect to the longitudinal axis M. Here, the widening is realized in conical form. The diameter D31 of the portion A3 at the transition to the portion A5 is thus larger than the diameter D3 at the transition from the first portion A1 to the second portion A3 of the nozzle opening 24.

FIG. 7.1 shows the detail view of a further exemplary embodiment of a nozzle 2 similar to FIG. 7. The dimensions are identical to those from FIG. 7. Only the second portion A3 is designed such that, as viewed from the front end 22 of the nozzle 2, its inner surface 220 widens in concave fashion. The virtual connecting line V3 that extends between the body edge 203 at the transition from the first portion A1 to the second portion A3 and the body edge 205 at the transition from the second portion A3 to the third portion A5 encloses for example an angle γ1 of approximately 5° with the longitudinal axis M. The diameter D31 of the portion A3 at the transition to the portion A5 is thus, in this example, larger than the diameter D3 at the transition from the first portion A1 to the second portion A3 of the nozzle opening 24.

FIG. 7.2 shows the detail view of a further exemplary embodiment of a nozzle 2 similar to FIG. 7.1. The dimensions are identical to those from FIG. 7.1. Only the second portion A3 is designed such that, as viewed from the front end 22 of the nozzle 2, its inner surface 220 widens in not concave but rather convex fashion.

FIG. 8 shows the detail view of a further exemplary embodiment of a nozzle 2 similar to FIG. 1. The second portion A3 is designed such that, as viewed from the front end 22 of the nozzle 2, its inner surface 220 narrows at an angle γ of for example 175° with respect to the longitudinal axis M. Here, the narrowing is realized in conical form. The diameter D32=1.17 mm of the second portion A3 at the transition from the first portion A1 to the second portion A3 is thus larger than the diameter D3=1 mm at the transition from the second portion A3 to the third portion A of the nozzle opening 24. The diameter D2 amounts to 1.4 mm and the diameter D1=2.1 mm. The angle α amounts to 19°, and the angle α1 amounts to 21°.

FIG. 8.1 shows the detail view of a further exemplary embodiment of a nozzle 2 similar to FIG. 8. The second portion A3 is however designed such that, as viewed from the front end 22 of the nozzle 2, its inner surface 220 narrows in convex fashion. The virtual connecting line V3 that extends between the body edge 203 at the transition from the first portion A1 to the second portion A3 and the body edge 205 at the transition from the second portion A3 to the third portion A5 encloses for example an angle γ1 of approximately 175° with the longitudinal axis M. The diameter D32=1.17 mm of the second portion A3 at the transition from the first portion A1 to the second portion A3 is thus larger than the diameter D3=1 mm at the transition from the second portion A3 to the third portion A of the nozzle opening 24. The diameter D2 amounts to 1.4 mm and the diameter D1=2.1 mm. The angle α in this example amounts to 19°, and the angle α1 in this example amounts to 21°.

FIG. 8.2 shows the detail view of a further exemplary embodiment of a nozzle 2 similar to FIG. 8.1. The second portion A3 is however designed such that, as viewed from the front end 22 of the nozzle 2, its inner surface 220 narrows in not convex but rather concave fashion.

FIG. 9 shows the detail view of a further exemplary embodiment of a nozzle 2 similar to FIG. 1. The dimensions are identical to those from FIG. 1. The third portion A5 has for example an angle δ of 80° between its inner surface 224 and the longitudinal axis M, and widens. It is however a nozzle whose outer contour differs from the other exemplary embodiments. Said nozzle is for example suitable for use in plasma torches, laser heads or plasma laser heads without liquid cooling for the nozzle. In this example, said nozzle has no groove 238 for receiving a round ring. A corresponding arrangement is shown in FIG. 18.

FIG. 9.1 shows the detail view of a further exemplary embodiment of a nozzle 2 similar to FIG. 9. The dimensions are identical to those from FIG. 9. Only the third portion A5 is designed such that, as viewed from the front end 22 of the nozzle 2, its inner surface 224 widens in concave fashion. The virtual connecting line V4, which extends between the body edge 205 (which in this case can also be referred to as "inner corner" or "body inner edge") at the transition from the second portion A3 to the third portion A5 and the body edge 206 (which in this case can also be referred to as "inner corner" or "body inner edge") at the transition from the third portion A5 to the fourth portion A7, encloses for example an angle γ1 of approximately 45° with the longitudinal axis M.

If the body edge 206 is not clearly recognizable as such, for example because the concave inner surface merges in continuous or "flowing" fashion into the inner surface 227, then the region 206 of the inner surface(s) is meant if, as viewed from the front end 22 of the nozzle, an angle δ2 of 20° is undershot between a tangent T applied to the inner surface 224 and the longitudinal axis M. This is shown in FIG. 9.3.

FIG. 9.2 shows the detail view of a further exemplary embodiment of a nozzle 2 similar to FIG. 9. The dimensions are identical to those from FIG. 9. Only the third portion A5 is designed such that, as viewed from the front end 22 of the nozzle 2, its inner surface 224 widens in convex fashion. The virtual connecting line V4 that extends between the body edge 205 at the transition from the second portion A3 to the third portion A5 and the body edge 206 at the transition from the third portion A5 to the fourth portion A7 encloses for example an angle γ1 of approximately 45° with the longitudinal axis M.

If the body edge 206 is not clearly recognizable as such, for example because the concave inner surface 224 merges in continuous or "flowing" fashion into the surface 227, then the region of the inner surface(s) with body edge 206 is meant if, as viewed from the front end 22 of the nozzle 2, an angle δ2 of 20° is undershot between a tangent T applied to the inner surface 224 and the longitudinal axis M. The virtual connecting line V4 then extends between said region 206 and body edge 205. This is shown in FIG. 9.3, which shows a concavely widening third portion A5.

FIG. 10 shows the detail view of a further exemplary embodiment of a nozzle 2 similar to FIG. 1. The dimensions are identical to those from FIG. 1. The fourth portion A7 has for example an angle ε of 5° between its inner surface 227 and the longitudinal axis M, and widens.

FIG. 11 shows the detail view of a further exemplary embodiment of a nozzle 2 similar to FIG. 1. The dimensions are identical to those from FIG. 1. The fourth portion A7 has for example an angle ε of 175° between its inner surface 227 and the longitudinal axis M, and narrows.

Radii, for example of the magnitude of 0.1 mm, may be arranged at the transitions between the respective portions A1, A3, A4, A5 and A7.

FIG. 12, FIG. 13 and FIG. 13a show the areas A10, A20, A30 and A31, formed perpendicular to the longitudinal axis M by the diameters D1, D2 and D3, of the nozzle opening 24. In the exemplary embodiments in FIGS. 1 to 11, the area A10 is at least 1.7 times larger, advantageously at least 2.1 times larger, than the area A30. Furthermore, it is at most 4 larger, advantageously at most 3.7 times larger, than the area A30.

FIG. 14 shows the volume V10, enclosed by the inner surfaces 211 and 213, of the nozzle opening 24 of the first portion A1 and FIG. 15 shows the volume V30 of the nozzle opening 24 of the second portion A3 enclosed by the inner surface 220. In the exemplary embodiments, the volume V10 is larger, advantageously at least 1.3 times larger, and/or at most 2.5 times larger, advantageously at most 2.2 times larger, than the volume V30.

FIG. 16 shows the sectional image of a plasma torch head 1, which may be a constituent part of a plasma torch.

The plasma torch head 1 has a torch body 8, an electrode 3, a nozzle 2 according to the invention, a nozzle cap 5, a nozzle bracket 81 which receives the nozzle 2, and a nozzle protection cap 6 which fixes the nozzle 2 in the nozzle bracket 81.

In this figure, the nozzle 2 from FIG. 1 is used as an example.

The front end 33 of the electrode 3 projects into the interior space of the nozzle 2. Furthermore, a gas-conducting unit 4 for the plasma gas or process gas PG is situated between the electrode 3 and the nozzle 2. The gas-conducting unit 4 has openings 41 which conduct the plasma gas or process gas through and in this case for example lead radially into the interior space between the electrode 3 and the nozzle 2. The plasma gas or process gas PG can be set in rotation by means of an offset with respect to the radial. The gas-conducting unit 4 electrically isolates the electrode 3 and nozzle 2 from one another. The electrode 3 may be liquid-cooled in the interior; this is not illustrated here. The cooling medium (WV—feed line, WR—return line) flows in the space 51 between the nozzle 2 and the nozzle cap 5 and cools these.

The front end of the nozzle 22 is at least partially covered by the nozzle protection cap 6. The nozzle protection cap 6 has an opening 64 which is in alignment with the nozzle opening 24 on the longitudinal axis M. A gas-conducting unit 7 for the secondary gas SG is situated between the nozzle cap 5, the front end 22 of the nozzle 2 and the nozzle protection cap 6. The gas-conducting unit 7 has openings 71 which conduct the secondary gas SG through and in this case for example lead radially into the interior space 61 between the nozzle cap 5, the front end 22 of the nozzle 2 and the nozzle protection cap 6. The plasma gas or process gas PG can be set in rotation by means of an offset with respect to the radial. The gas-conducting unit 7 electrically isolates the nozzle cap 5 and the nozzle protection cap 6 from one another.

During the plasma cutting, the plasma gas or process gas PG is ionized by an arc and ultimately flows out of the nozzle opening 24 and the opening of the nozzle protection cap 64.

FIG. 17 and FIG. 17a each show a sectional detail view of an arrangement according to a particular embodiment of the invention, which is a constituent part of the plasma torch head from FIG. 16. This arrangement may however likewise be a constituent part of a laser cutting head or be a plasma laser cutting head. The claimed arrangement comprises the nozzle 2 and the nozzle protection cap 6. The nozzle cap 5 and the gas-conducting unit 7 are also shown.

The front end of the nozzle 2 is at least partially covered by the nozzle protection cap 6. The nozzle protection cap 6 has an opening 64 which is in alignment with the nozzle opening 24 on the longitudinal axis M. A gas-conducting unit 7 for secondary gas SG is situated between the nozzle cap 5, the front end 22 of the nozzle 2 and the nozzle protection cap 6. The gas-conducting unit 7 has openings 71 which conduct the secondary gas SG through and in this case for example lead radially into the interior space 61 between the nozzle cap 5, the front end 22 of the nozzle 2 and the nozzle protection cap 6. The plasma gas or process gas PG can be set in rotation by means of an offset with respect to the radial. The gas-conducting unit 7 electrically isolates the nozzle cap 5 and the nozzle protection cap 6 from one another.

The nozzle 2 has, for example as per FIG. 1, a diameter D1=1.9 mm and D3=1.0 mm. The nozzle protection cap 6 has an opening 64 with a smallest diameter D6 of 3.0 mm. The diameter D6 is larger than the diameters D1 and D3. The area A60 formed perpendicularly with respect to the longitudinal axis by the diameter D6 is larger than the area A10 formed by the diameter D1 and the area A30 formed by the diameter D3.

The angle α of the nozzle 2 amounts to 19° in this example and the angle α1 of the nozzle 2 amounts to 24° in this example. If one virtually extends the inner surfaces 211, which narrow conically as viewed from the front, in the direction of the front end 22 of the nozzle, that is to say out of the nozzle 2, then this forms the virtual line V2. Said virtual line does not intersect the body edge 65, formed by the opening 64 with the diameter D6, of the nozzle protection cap 6. The same applies to the extended virtual connecting line V1 between the body edge 201 of the nozzle opening 24 at the front end 22 and the body edge 203 at the transition from the first portion A1 to the second portion A3.

The area A60 and the diameter D6 of the opening 64 of the nozzle protection cap 6 are larger than the virtual areas A70 and A80 or diameters of the nozzle 2 projected by the extended virtual connecting lines V1 and V2 onto the nozzle protection cap 6.

Furthermore, the length L61 of the shortest spacing between the outer surface of the front end 22 of the nozzle 2 and the inner surface of the nozzle protection cap 6 is for example 0.7 mm and is therefore smaller than the length L1=1.0 mm of the first portion A1 and the length L3=1.0 mm of the second portion A3 of the nozzle 2 and also smaller than the sum L1 and L3, which amounts to 2 mm.

FIG. 18 and FIG. 18a show a sectional detail view of an arrangement according to a particular embodiment of the invention. The claimed arrangement comprising the nozzle 2 from FIG. 9 and a nozzle protection cap 6. A gas-conducting unit 7 is also shown. This arrangement may be a constituent part of a plasma torch head, of a laser cutting head or may be a plasma laser cutting head.

By contrast to FIG. 17, the nozzle 2 is not surrounded by a nozzle cap. The nozzle 2 has a diameter D1=1.9 mm and D3=1.0 mm. The nozzle protection cap 6 has an opening 64 with a smallest diameter D6 of 3.0 mm. The diameter D6 is larger than the diameter D1 and D3 of the nozzle 2. The area A60 formed perpendicularly with respect to the longitudinal axis by the diameter D6 is larger than the area A10 formed by the diameter D1 and the area A30 formed by the diameter D3.

The front end of the nozzle 22 is at least partially covered by the nozzle protection cap 6. The nozzle protection cap 6 has an opening 64 which is in alignment with the nozzle opening 24 on the longitudinal axis M. A gas-conducting unit 7 for the secondary gas SG is situated between the nozzle 2 and the nozzle protection cap 6. The gas-conducting unit 7 has openings 71 which conduct the secondary gas SG through and in this case for example leads radially into the interior space 61 between the nozzle 2 and the nozzle protection cap 6. The plasma gas PG can be set in rotation by means of an offset with respect to the radial (see FIG. 21). The gas-conducting unit 7 electrically isolates the nozzle 2 and the nozzle protection cap 6 from one another.

The angle α of the nozzle 2 amounts to 19° in this example and the angle α1 of the nozzle 2 amounts to 24° in this example. If one virtually extends the inner surface, which narrows conically as viewed from the front, in the direction of the front end 22 of the nozzle 2, that is to say out of the nozzle 2, then this forms the virtual line V2. Said virtual line does not intersect the body edges 65, formed by the opening 64 with the diameter D6, of the nozzle protection cap 6. The same applies to the extended virtual connecting line V1 between the body edge 201 of the nozzle opening 24 at the front end 22 and the body edge 203 at the transition from the first portion A1 to the second portion A3.

The area A60 and the diameter D6 of the opening 64 of the nozzle protection cap 6 are larger than the virtual areas A70 and A80 or diameters of the nozzle 2 projected by the extended virtual connecting lines V1 and V2 onto the nozzle protection cap 6.

Furthermore, the length L61 of the shortest spacing between the outer surface of the front end 22 of the nozzle 2 and the inner surface of the nozzle protection cap 6 is for example 0.7 mm and is therefore smaller than the length L1=1.0 mm of the first portion A1 and the length L3=1.0 mm of the second portion A3 of the nozzle 2 and also smaller than the sum L1 and L3, which amounts to 2 mm.

FIG. 19 shows a sectional detail view of an arrangement according to a particular embodiment of the invention, which is a constituent part of the plasma torch head from FIG. 16. The claimed arrangement comprises a nozzle 2 according to a particular embodiment of the invention and an electrode 3. A gas-conducting unit 4 is also shown.

The front end 33 of the electrode 3 projects into the interior space of the nozzle 2. Furthermore, a gas-conducting unit 4 for the plasma gas PG is situated between the electrode 3 and the nozzle 2. The gas-conducting unit 4 has openings 41 which conduct the plasma gas through and in this case for example lead radially into the interior space between the electrode 3 and the nozzle 2. The plasma gas PG can be set in rotation by means of an offset with respect to the radial. The gas-conducting unit 4 electrically isolates the electrode 3 and the nozzle 2 from one another. The spacing L13 between the front end 33 of the electrode 3 and the transition from the third portion A5 to the second portion A3 of the nozzle opening 24 of the nozzle 2 is 6 mm in length, the length L1 of the first portion A1 and the length L3 of the second portion A3 each amount to 1 mm. The sum of the lengths L1 and L3 then amounts to 2 mm. Thus, both L1, L2 and the sum of both are shorter than the length of the spacing L13.

FIG. 20 shows, by way of example, the gas-conducting unit 7 for the secondary gas SG. It can be seen from the central sectional illustration that the openings 71 are arranged so as to be offset with respect to the radial to the longitudinal axis M. The gas flowing through the openings 71 is thus set in rotation. The rotation may however also be realized by means of a different spatial orientation of the openings, for example an inclination with respect to the longitudinal axis M.

FIG. 21 shows, by way of example, the gas-conducting unit 4 for the plasma gas or process gas. It can be seen from the central sectional illustration that the openings 41 are arranged so as to be offset with respect to the radial to the longitudinal axis M. The gas flowing through the openings 41 is thus set in rotation. The rotation may however also be realized by means of a different spatial orientation of the openings, for example an inclination with respect to the longitudinal axis M.

The above description has been directed to a nozzle for plasma cutting or for a plasma torch head. The plasma torch head may be a plasma torch cutting head. The description is however intended to also apply analogously to a nozzle for laser cutting or for a laser cutting head and for plasma laser cutting or for a plasma laser cutting head.

The features of the invention disclosed in the above description, in the drawings and in the claims may be essential both individually and in any combinations for the realization of the invention in its various embodiments.

LIST OF REFERENCE DESIGNATIONS

1 Plasma torch, plasma torch head, plasma torch cutting head, plasma laser cutting head
2 Nozzle
3 Electrode
4 Gas-conducting unit for plasma gas; process gas
5 Nozzle cap
6 Nozzle protection cap
7 Gas-conducting unit for secondary gas
8 Torch body
20 Body
21 Inner surface
22 Front end
23 Outer surface
24 Nozzle opening
25 Interior space of the nozzle
28 Rear end
31 Emission insert of the electrode 3
32 Electrode holder
33 Front end of the electrode
34 Outer surface of the electrode
41 Openings in the gas-conducting unit 4 for the plasma gas
51 Space between nozzle 2 and nozzle cap 5
55 Nozzle protection cap bracket
61 Interior space between nozzle protection cap 6 and nozzle cap 5 and nozzle 2
62 Inner surface of the nozzle protection cap
64 Opening of the nozzle protection cap
65 Body edge of the opening of the nozzle protection cap
71 Openings in the gas-conducting unit 7 for the secondary gas
81 Nozzle holder
201 Body edge of the nozzle opening at the front end 22 of the nozzle opening 24
203 Body edge of the nozzle opening at the front end 22 of the nozzle opening 24 at the transition of the portion A1 to A3
204 Body edge between inner surfaces 211 and 213
205 Body edge between inner surfaces 220 and 224
206 Body edge between inner surfaces 224 and 227
211 Inner surface of the first portion A1
213 Further inner surface of the first portion A1
220 Inner surface of the second portion A3
224 Inner surface of the third portion A5
227 Inner surface of the fourth portion A7
230 Surface at the front end 22 of the nozzle
238 Groove
240 Round ring
A1 First portion
A3 Second portion
A5 Third portion
A7 Fourth portion
A10 Area of the nozzle opening at the front end 22 at D1
A20 Further area of the nozzle opening in the first portion at D2
A30 Area of the smallest nozzle opening in the second portion A3 at D3
A31 Area of the nozzle opening in the second portion
A60 Area of the opening 64 of the nozzle protection cap
A70 Projected virtual area from the connecting line V1 onto the plane of the area A60
A80 Projected virtual area from the connecting line V2 onto the plane of the area A60
D1 Diameter of the nozzle opening in the first portion A1 at the front end
D2 Further diameter of the nozzle opening in the first portion A1
D3 Diameter of the nozzle opening in the second portion ($\gamma=0°$ or $180°$)
D31 Further diameter of the nozzle opening in the second portion ($\gamma>0°$ to $8°$)
D32 Further diameter of the nozzle opening in the second portion ($\gamma<180°$ to $172°$)
D6 Diameter of the opening 64 of the nozzle protection cap
D7 Diameter in the portion A7
D70 Diameter of the projected virtual area A70
D80 Diameter of the projected virtual area A80
L1 Length of the first portion A1
L3 Length of the second portion A3
L5 Length of the third portion A5
L7 Length of the fourth portion A7
L13 Spacing between the front end 33 of the electrode 3
L61 Spacing between the outer surface of the front end 22 of the nozzle 2 and the inner surface 62 of the nozzle protection cap 6
L20 Total length of the nozzle
M Longitudinal axis
PG Plasma gas or process gas
SG Secondary gas
T Tangent
V1 Virtual connecting line between the body edge 201 and 203
V2 Virtual connecting line between the body edge 201 and 204
V3 Virtual connecting line between the body edge 203 and 205
V4 Virtual connecting line between the body edge 205 and 206
V10 Volume of the first portion A1 of the nozzle opening 24
V30 Volume of the second portion A3 of the nozzle opening 24
WR Coolant return line
WV Coolant feed line
$\alpha$ Angle between longitudinal axis M and the virtual connecting line V2 or the inner surface 211 of the first portion A1
$\alpha 1$ Angle between the longitudinal axis M and the virtual connecting line V1 of the first portion A1
$\alpha 2$ Angle between the longitudinal axis M and the tangent T β Angle between longitudinal axis M and inner surface 213 of the first portion A1
γ Angle between longitudinal axis M and inner surface 220 of the second portion A3
γ1 Angle between longitudinal axis M and the virtual connecting line V3 of the second portion A3
δ Angle between longitudinal axis M and inner surface 224 of the third portion A5
δ1 Angle between longitudinal axis M and the virtual connecting line V4 of the third portion A5
ε Angle between longitudinal axis M and inner surface 227 of the fourth portion A7

The invention claimed is:

1. A nozzle for a plasma torch head, laser cutting head or plasma laser cutting head, comprising:
a body with a longitudinal axis M, a front end, a rear end and a nozzle opening at said front end, wherein said nozzle opening at said front end, as viewed from said front end, comprises at least the following portions in a longitudinal sectional view:
a first portion A1 which extends along said longitudinal axis M and which narrows in the direction of said rear end and which has an inner surface and a body edge at said front end,
a second portion A3 which extends along said longitudinal axis M and which has an inner surface and a body edge at the transition from said first portion A1 to said second portion A3; and
at the transition from said first portion A1 to said second portion A3, the diameter D3 of said second portion A3 is between 0.2 mm and 0.6 mm smaller than the diameter D2 and/or the smallest diameter D2 of said first portion A1;
wherein a virtual connecting line V1 between said body edge of said nozzle opening at said front end and said body edge at the transition from said first portion A1 to said second portion A3 and said longitudinal axis M enclose an angle α1 in a range from 15° to 40°, and/or the inner surface of the first portion A1 and the longitudinal axis M enclose an angle α in a range from 10° to 30° and/or the inner surface of said first portion A1 and said longitudinal axis M enclose an angle α1 in a range from 10° to 30°; and
either a virtual connecting line V3 between said body edge at the transition from said first portion A1 to said second portion A3 and said body edge at the transition from said second portion A3 to a third portion A5 and said longitudinal axis M encloses an angle γ1 in a range from 0° to 8°, and widens in the direction of said rear end, or in a range from 172° to 180°, and narrows in the direction of said rear end, or runs parallel to the longitudinal axis M; or
the inner surface of said second portion A3 widens at an angle γ in a range from 0° to 8° in the direction of said rear end or narrows at an angle in a range from 172° to 180° in the direction of said rear end, or runs parallel to the longitudinal axis M.

2. The nozzle of claim 1, further comprising, at the transition or before or immediately before the transition from said first portion A1 to said second portion A3, there is situated at least one further inner surface which extends at an angle β with respect to said longitudinal axis M in a range from 45° to 120°.

3. The nozzle of claim 1 further comprising, as viewed from said front end, after said second portion A3, said third portion A5 extends along said longitudinal axis M, which widens in the direction of said rear end and which has an inner surface.

4. The nozzle of claim 3 wherein said inner surface of said third portion A5 has at least one region which widens along said longitudinal axis M in the direction of said rear end and whose inner surface and said longitudinal axis M enclose an angle δ in a range from 30° to 90°.

5. The nozzle of claim 3 further comprising, as viewed from said front end, a fourth portion A7 with an inner surface is provided after said third portion A5, and a virtual connecting line V4 between said body edge at said transition from said second portion A3 to said third portion A5 and said body inner edge at the transition from said third portion A5 to said fourth portion A7 and said longitudinal axis M enclose an angle δ1 in a range from 30° to 90° and/or said inner surface of said third portion A5 and said longitudinal axis M enclose an angle δ in a range from 30° to 90°.

6. The nozzle of claim 3 further comprising, as viewed from said front end, a fourth portion A7 with an inner surface is provided after said third portion A5;
wherein the inner surface of said fourth portion A7 has at least one region which widens at an angle with respect to said longitudinal axis M in a range from 0° to 10° in the direction of said rear end or narrows at an angle in a range from 170° to 180° in the direction of said rear end, or runs parallel to said longitudinal axis M; or
wherein the inner surface of said fourth portion A7 widens at an angle c with respect to said longitudinal axis M in a range from 0° to 10° in the direction of said rear end or narrows at an angle in a range from 170° to 180° in the direction of said rear end, or runs parallel to said longitudinal axis M.

7. The nozzle of claim 1 further comprising said first portion A1, as viewed from said front end, narrows in any one of conical fashion, convex fashion, concave fashion, continuous fashion, discontinuous fashion, or stepped fashion.

8. The nozzle of claim 1 further comprising said second portion A3 narrows or widens in any one of conical fashion, convex fashion, concave fashion, continuous fashion, discontinuous fashion, stepped fashion, or perpendicularly with respect to the longitudinal axis M.

9. The nozzle of claim 1 further comprising said third portion A5 widens in any one of conical fashion, convex fashion, concave fashion, continuous fashion, discontinuous fashion, stepped fashion, or perpendicularly with respect to the longitudinal axis M.

10. The nozzle of claim 5 further comprising said fourth portion A7 narrows or widens in any one of conical fashion, convex fashion, concave fashion, continuous fashion, discontinuous fashion, stepped fashion, or perpendicularly with respect to the longitudinal axis M.

11. The nozzle of claim 1 further comprising said first portion A1 and said second portion A3 directly follow one another.

12. The nozzle of claim 1 further comprising said second portion A3 and said third portion A5 directly follow one another.

13. The nozzle of claim 5 further comprising said third portion A5 and said fourth portion A7 directly follow one another.

14. The nozzle of claim 1 further comprising said first portion A1, said second portion A3, and said third portion A5 directly follow one another.

15. The nozzle of claim 5 further comprising said second portion A3, said third portion A5, and said fourth portion A7 directly follow one another.

16. The nozzle of claim 5 further comprising said first portion A1, said second portion A3, said third portion A5, and said fourth portion A7 directly follow one another.

17. The nozzle of claim 1 further comprising a largest cross-sectional area A10 of said first portion A1, and/or a largest cross-sectional area A10 of said nozzle opening situated directly at said front end of said nozzle opening, are in the range of 1.7 to 4.0 times larger, than a smallest cross-sectional area A30, A31 of said second portion A3 and/or a smallest cross-sectional area A30, A31 of said nozzle opening.

18. The nozzle of claim 1 further comprising a largest diameter D1 of said first portion A1, and/or a largest diameter D1 of said nozzle opening situated directly at said front end of said nozzle opening, are in the range of 1.3 to 2.1 times larger, than a smallest diameter D3 of said second portion A3 and/or a smallest diameter D3 of said nozzle opening.

19. The nozzle of claim 1 further comprising a largest diameter D1 of said first portion A1, and/or a largest diameter D1 of said nozzle opening situated directly at said front end of said nozzle opening, are in the range of 0.5 mm to 1.2 mm larger than a smallest diameter D3 of said second portion A3 and/or a smallest diameter D3 of said nozzle opening.

20. The nozzle of claim 1 further comprising the quotient L1/L3 of a length L1, extending along said longitudinal axis M, of said first portion A1 and of a length L3, extending along said longitudinal axis M, of said second portion A3 is between 0.5 to 1.2.

21. The nozzle of claim 1 further comprising the quotient L5/L1 of a length L5, extending along said longitudinal axis M, of said third portion A3 and of a length L1, extending along said longitudinal axis M, of said first portion A1 is less than or equal to 1.5.

22. The nozzle of claim 1 further comprising the quotient L5/L3 of a length L5, extending along said longitudinal axis M, of said third portion A3 and of a length L3, extending along said longitudinal axis, of said second portion A3 is less than or equal to 1.25.

23. The nozzle of claim 1 further comprising for the lengths of said first portion A1, said second portion A3, said third portion A5, the following applies: L1<=2 mm, L3<=3 mm, and L5<=2 mm.

24. The nozzle of claim 1 further comprising for the lengths of said fourth portion A7, L7<=3 mm.

25. The nozzle of claim 1 further comprising the quotient L3/D3 of the length L3, extending along said longitudinal axis M, of said second portion A3 and of the diameter D3 of said second portion A3 is between 0.6 and 1.7.

26. The nozzle of claim 5 further comprising a largest diameter D7 of said fourth portion A7 is at least equal to, and at most twice as large as, the largest diameter D1 of said first portion A1 and/or a or the largest diameter D1 of said nozzle opening situated directly at said front end of said nozzle opening.

27. The nozzle of claim 1 further comprising a volume V10 formed by the inner surface(s) of said first portion A1 is 1.3 to 2.2 times larger than a volume V30 formed by the inner surface of said second portion A3.

* * * * *